US012576403B2

(12) United States Patent
Senda et al.

(10) Patent No.: US 12,576,403 B2
(45) Date of Patent: Mar. 17, 2026

(54) SPECIMEN CONTAINER AND CAP

(71) Applicant: SYSMEX CORPORATION, Kobe (JP)

(72) Inventors: Go Senda, Kobe (JP); Hiroki Koike, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 1153 days.

(21) Appl. No.: 17/485,569

(22) Filed: Sep. 27, 2021

(65) Prior Publication Data

US 2022/0008915 A1 Jan. 13, 2022

Related U.S. Application Data

(63) Continuation of application No. PCT/JP2020/011890, filed on Mar. 18, 2020.

(30) Foreign Application Priority Data

Mar. 28, 2019 (JP) ................................ 2019-062668

(51) Int. Cl.
*B01L 3/00* (2006.01)

(52) U.S. Cl.
CPC ........... *B01L 3/50825* (2013.01); *B01L 3/502* (2013.01); *B01L 2200/0689* (2013.01); *B01L 2300/042* (2013.01); *B01L 2300/048* (2013.01)

(58) Field of Classification Search
CPC ................. B01L 3/502; B01L 3/50825; B01L 2200/0689; B01L 2200/141; B01L 2300/042; B01L 2300/044; B01L 2300/046; B01L 2300/048; B01L 2300/069; B01L 2400/024; G01N 35/02
See application file for complete search history.

(56) References Cited

U.S. PATENT DOCUMENTS 2,848,130 A 8/1958 Charles
4,293,078 A 10/1981 Edward et al.
4,515,752 A 5/1985 Miramanda
(Continued)

FOREIGN PATENT DOCUMENTS

CN 106053138 A 10/2016
EP 0 097 591 A1 1/1984
(Continued)

OTHER PUBLICATIONS

The extended European search report (EESR) issued on Nov. 4, 2022 in a counterpart European patent application.
(Continued)

*Primary Examiner* — Elizabeth A Robinson
*Assistant Examiner* — Austin Q Le
(74) *Attorney, Agent, or Firm* — METROLEX IP LAW GROUP, PLLC; Robert L. Scott, Esq.

(57) ABSTRACT

The specimen container according to one or more embodiments may include: a container main body including an opening; a cap arranged to close the opening of the container main body and including a slit-formed portion in which a slit that allows an aspiration tube to pass therethrough is formed; and a contact portion provided in a position different from that of the slit and that is brought into contact with a peripheral surface of the aspiration tube at least while the aspiration tube is withdrawn from the slit.

19 Claims, 11 Drawing Sheets

(56) References Cited

U.S. PATENT DOCUMENTS

| | | | | |
|---|---|---|---|---|
| 4,774,055 | A | 9/1988 | Wakatake et al. | |
| 5,125,544 | A | 6/1992 | Millner et al. | |
| 5,409,144 | A | 4/1995 | Brown | |
| 6,273,296 | B1 | 8/2001 | Brown | |
| 2002/0131902 | A1 | 9/2002 | Levy | |
| 2004/0071786 | A1 | 4/2004 | Grippi et al. | |
| 2008/0237271 | A1 | 10/2008 | Olechowski | |
| 2009/0145876 | A1* | 6/2009 | Kawamura | B65D 51/002 215/353 |
| 2009/0188950 | A1 | 7/2009 | Gaus et al. | |
| 2014/0038228 | A1* | 2/2014 | Percy | B01L 3/50825 435/30 |
| 2015/0224497 | A1 | 8/2015 | Furrer et al. | |
| 2016/0039578 | A1 | 2/2016 | Karam et al. | |
| 2016/0338912 | A1* | 11/2016 | Oberlin | A61J 1/22 |
| 2019/0120869 | A1* | 4/2019 | Belz | G01N 35/1011 |

FOREIGN PATENT DOCUMENTS

| | | | | |
|---|---|---|---|---|
| EP | 0170098 | A2 | 2/1986 | |
| EP | 2617657 | A1 | 7/2013 | |
| EP | 3165921 | A1 * | 5/2017 | B01L 3/5021 |
| ES | 1045571 | U | 9/2000 | |
| JP | S59-10349 | A | 1/1984 | |
| JP | H11-124153 | A | 5/1999 | |
| JP | 2002-531346 | A | 9/2002 | |
| JP | 2003-033423 | A | 2/2003 | |
| JP | 2003-522318 | A | 7/2003 | |
| JP | 2005-324832 | A | 11/2005 | |
| JP | 2007-205728 | A | 8/2007 | |
| JP | 2012-159358 | A | 8/2012 | |
| JP | 2013-249096 | A | 12/2013 | |
| JP | 2014-506858 | A | 3/2014 | |
| JP | 2014-517916 | A | 7/2014 | |
| JP | 2014-144782 | A | 8/2014 | |
| JP | 2014-211437 | A | 11/2014 | |
| JP | 2016-054805 | A | 4/2016 | |
| JP | 2017-178437 | A | 10/2017 | |
| JP | 6419373 | B1 | 11/2018 | |
| WO | 99/45360 | A1 | 9/1999 | |
| WO | 2015/118076 | A2 | 8/2015 | |
| WO | 2018/161618 | A1 | 9/2018 | |

OTHER PUBLICATIONS

The extended European search report (EESR) issued on Dec. 7, 2022 in a related European patent application.

The Office Action (CNOA) issued on Nov. 2, 2022 in a related Chinese patent application.

Japanese Office Action issued on Jan. 10, 2023 in a counterpart Japanese patent application.

Japanese Office Action issued on Dec. 22, 2022 in a related Japanese patent application.

Chinese Office Action issued on May 30, 2022 in a related Chinese patent application.

Chinese Office Action issued on May 11, 2022 in a counterpart Chinese patent application.

An English translation of the International Search Report("ISR") of PCT/JP2020/011890 issued on Jun. 23, 2020.

The Written Opinion("WO") of PCT/JP2020/011890 issued on Jun. 23, 2020.

Japanese Office Action issued on May 16, 2023 in a counterpart Japanese patent application.

The Office Action issued on Mar. 14, 2025 in related U.S. Appl. No. 17/485,704.

The Office Action issued on Sep. 16, 2025 in a related U.S. Appl. No. 17/485,704.

The extended European search report issued on Sep. 18, 2025 in related European patent application No. 20777847.3.

* cited by examiner

SPECIMEN CONTAINER AND CAP

CROSS REFERENCE TO RELATED APPLICATIONS

This application is a continuation application of International Application No. PCT/JP2020/011890, filed on Mar. 18, 2020, which claims priority based on the Article 8 of Patent Cooperation Treaty from prior Japanese Patent Application No. 2019-062668, filed on Mar. 28, 2019, the entire contents of which are incorporated herein by reference.

TECHNICAL FIELD

The disclosure relates to a specimen container and a cap.

BACKGROUND

International Publication No. WO2015/118076 (hereinafter referred to as "Patent Literature 1") discloses a specimen container 900 including a container main body 902 including an opening 901, and a cap 903 arranged to close the opening 901 of the container main body 902 and including a slit (cut hole) 904 formed to allow an aspiration tube 905 to pass therethrough, as illustrated in FIG. 22. The specimen container 900 stores a body fluid specimen such as blood and urine. This specimen container 900 of Patent Literature 1 is configured such that the aspiration tube 905 is inserted into the specimen container 900 through the slit 904 of the cap 903 to aspirate the specimen, and after the aspiration, the aspiration tube 905 is withdrawn from the slit 904, which closes the slit 904 to close the specimen container 900.

SUMMARY

The specimen container disclosed in Patent Literature 1 described above is set in an automatic measuring apparatus. After the specimen in the specimen container is aspirated by an aspiration tube included in the automatic measuring apparatus, a measuring operation for the specimen is executed in the automatic measuring apparatus. In the automatic measuring apparatus, the aspiration tube after the aspiration of the specimen is cleaned with a cleaning liquid in order to inhibit carry-over of the specimen when multiple specimens are measured. However, since there are expected to be various types of specimens from a case where the concentration of components contained in the specimen is high or a case where the viscosity of the specimen is high, for example, it is required to secure the sufficient cleaning capacity and cleaning time for the aspiration tube in the automatic measuring apparatus.

If the specimen attached to the aspiration tube after the withdrawal from the specimen container is reduced, it is possible to relax the conditions of the cleaning capacity and cleaning time required for the cleaning processing of the aspiration tube in the automatic measuring apparatus. In view of this, a specimen container that is capable of inhibiting the specimen from remaining on the surface of the aspiration tube after the withdrawal from the specimen container is desired.

A specimen container and a cap according to one or more embodiments may be directed to inhibit a specimen from remaining on a surface of an aspiration tube after the withdrawal from a specimen container.

A specimen container (100) according to one or more embodiments may include, for example, as illustrated in FIG. 1: a container main body (20) including an opening (21); a cap (10) arranged to close the opening (21) of the container main body (20) and including a slit-formed portion (11) in which a slit (11*a*) that allows an aspiration tube (30) to pass therethrough is formed; and a contact portion (12) provided in a position different from that of the slit (11*a*) and that is brought into contact with a peripheral surface (31) of the aspiration tube (30) at least when the aspiration tube (30) is withdrawn from the slit (11*a*). The phrase "brought into contact with the peripheral surface of the aspiration tube at least when the aspiration tube is withdrawn from the slit" may have a meaning that a configuration in which the contact portion is not brought into contact with the peripheral surface of the aspiration tube when the aspiration tube is inserted into the slit to aspirate the specimen in the container for specimen is possible.

In the specimen container (100) according to one or more embodiments, as described above, not only the slit (11*a*) formed in the cap (10) but also the contact portion (12) provided in a position different from that of the slit (11*a*) is brought into contact with the peripheral surface (31) of the aspiration tube (30) at least when the aspiration tube (30) is withdrawn from the slit (11*a*). Therefore, during the withdrawal of the aspiration tube (30), the specimen attached to the peripheral surface (31) of the aspiration tube (30) is removed not only by the contact between the aspiration tube (30) and the inner surface of the slit (11*a*) but also by the contact between the aspiration tube (30) and the contact portion (12). Consequently, it may be possible to inhibit the specimen attached to the peripheral surface (31) of the aspiration tube (30) from remaining thereon after the aspiration tube (30) that aspirates the specimen is withdrawn from the specimen container (100). With the above configuration, it may be possible to inhibit the specimen from remaining on the surface of the aspiration tube (30) after the withdrawal from the specimen container (100).

For example, as illustrated in FIG. 5, in the specimen container (100) according to one or more embodiments, it may be preferable that the contact portion (12) is arranged to surround the center of the slit (11*a*) as viewed in the passing direction of the aspiration tube (30). With this configuration, it may be possible to arrange the contact portion (12) to surround the aspiration tube (30) inserted in the slit (11*a*). Therefore, it may be possible to remove the specimen attached to the aspiration tube (30) over a wider range in a circumferential direction of the peripheral surface (31) of the aspiration tube (30). Therefore, it may be possible to effectively inhibit the specimen from remaining on the surface of the aspiration tube (30).

For example, as illustrated in FIG. 4, in the specimen container (100) according to one or more embodiments, it may be preferable that the container main body (20) is in a cylindrical shape including a bottom surface (22) on the opposite side from the opening (21), and the contact portion (12) includes a first contact portion (110) provided on a surface (11*c*) of the slit-formed portion (11) on the bottom surface (22) side. With this configuration, when the aspiration tube (30) is withdrawn from the slit (11*a*), a region of the aspiration tube (30) to which the specimen is attached reaches the first contact portion (110) first, and after the attached specimen is removed, the region reaches the slit-formed portion (11). Therefore, it may be possible to inhibit the specimen attached to the aspiration tube (30) from being removed by the slit (11*a*). If the specimen is removed by the slit (11*a*), the specimen is attached to the portion of the slit (11*a*) of the slit-formed portion (11). With the aspiration tube (30) being inserted into the slit (11*a*), the slit (11*a*) is pushed and expanded, and a clearance is formed, and with the aspiration tube (30) being withdrawn therefrom, the slit (11*a*) is restored, and the clearance is closed. Therefore, if the specimen is attached to the portion of the slit (11*a*), the specimen attached to the slit (11*a*) may be scattered when the aspiration tube (30) is withdrawn from the slit (11*a*), and the clearance is closed. With the above-described configuration, since it is possible to inhibit the specimen attached to the aspiration tube (30) from being removed by the slit (11*a*), it may be possible to inhibit the specimen attached to the slit (11*a*) from being scattered.

For example, as illustrated in FIG. 7, in this case, it may be preferable that the first contact portion (110) includes protrusions (111) arranged around the center of the slit (11*a*) and the protrusions (111) are moved toward the aspiration tube (30) along with deformation of the slit-formed portion (11) when the aspiration tube (30) is withdrawn from the slit (11*a*). With this configuration, the slit-formed portion (11) is deformed to be dragged to the opening (21) side due to a friction between the aspiration tube (30) and the slit-formed portion (11) during the withdrawal of the aspiration tube (30). With use of the deformation of the slit-formed portion (11), it may be possible to move the protrusions (111) toward the aspiration tube (30) to push the protrusions (111) against the peripheral surface (31) of the aspiration tube (30). Consequently, it may be possible to remove the specimen attached to the aspiration tube (30) more reliably.

For example, as illustrated in FIG. 7, in the configuration in which the protrusions (111) are moved toward the aspiration tube (30) along with the deformation of the slit-formed portion (11) when the aspiration tube (30) is withdrawn from the above-described slit (11*a*), it may be preferable that in the slit-formed portion (11), the surface (11*c*) on the bottom surface (22) side is deformed to the opening (21) side due to sliding on the aspiration tube (30) in the slit (11*a*), and the protrusions (111) bring tip portions (112) thereof into contact with the peripheral surface (31) of the aspiration tube (30) by bending over to the aspiration tube (30) side along with the deformation of the slit-formed portion (11) to the opening (21) side. With this configuration, with the slit-formed portion (11) being dragged to the opening (21) side due to the friction with the aspiration tube (30), the surface (11*c*) of the slit-formed portion (11) on the bottom surface (22) side is tilted to be close to the peripheral surface (31) of the aspiration tube (30) while the aspiration tube (30) is centered. Therefore, it may be possible to bend the protrusions (111) provided on the surface (11*c*) of the slit-formed portion (11) on the bottom surface (22) side to be tilted to the aspiration tube (30) side and to press the protrusions (111) against the aspiration tube (30). Thus, with use of the deformation of the slit-formed portion (11) during the withdrawal of the aspiration tube (30), it may be possible to bring the first contact portion (110) into contact with the aspiration tube (30) more reliably with a simple structure.

For example, as illustrated in FIG. 11, in this case, it may be preferable that the slit-formed portion (11) includes sections (11*b*) divided by the slit (11*a*), and the number of the protrusions (111) is greater than the number of the sections (11*b*). With this configuration, it may be possible to remove the specimen attached to the aspiration tube (30) by the protrusions (111) of the number greater than the number of the sections (11*b*) with which the aspiration tube (30) is brought into contact while passing through the slit (11*a*). Therefore, it may be possible to remove the specimen attached to the aspiration tube (30) more effectively.

For example as illustrated in FIG. 9, in the configuration in which the protrusions (111) are moved toward the aspiration tube (30) along with the deformation of the slit-formed portion (11) when the aspiration tube (30) is withdrawn from the above-described slit (11*a*), it may be preferable that the protrusions (111) form the first contact portion (110) in a ring shape with tip portions (112) of adjacent ones of the protrusions (111) being brought into contact with each other along with the deformation of the slit-formed portion (11) during the withdrawal of the aspiration tube (30), and an inner diameter of the ring-shaped first contact portion (110) coincides with an outer diameter of the aspiration tube (30). With this configuration, with the protrusions (111) being adjacent to each other to form the ring-shaped first contact portion (110) and being pushed against the peripheral surface (31) of the aspiration tube (30), the inner diameter of the ring-shaped first contact portion (110) coincides with the outer diameter of the aspiration tube (30). Consequently, the first contact portion (110) can be brought into contact with the peripheral surface (31) of the aspiration tube (30) over the entire periphery in the circumferential direction, and thus it may be possible to more effectively inhibit the specimen attached to the aspiration tube (30) from remaining thereon.

For example, as illustrated in FIG. 4, in the configuration in which the protrusions (111) are moved toward the aspiration tube (30) along with the deformation of the slit-formed portion (11) when the aspiration tube (30) is withdrawn from the above-described slit (11*a*), it may be preferable that the cap (10) further includes an elastic portion (15) provided to surround the slit-formed portion (11) and the first contact portion (110) and that is elastically deformed to movably support the slit-formed portion (11) and the first contact portion (110). With this configuration, tensile deformation of the elastic portion (15) occurs due to the friction from the withdrawal of the aspiration tube (30) inserted in the slit (11*a*), and the elastic portion (15) moves the entire slit-formed portion (11) and first contact portion (110) to the opening (21) side. Since the movement amount of the slit-formed portion (11) and the first contact portion (110) is increased by the elastic portion (15), it may be possible to tilt the surface (11*c*) of the slit-formed portion (11) on the bottom surface (22) side in which the protrusions (111) are provided by a great amount. Consequently, since it is possible to increase the movement amount of the protrusions (111), it may be possible to bring the protrusions (111) into contact with the peripheral surface (31) of the aspiration tube (30) more reliably. It may be possible to move the entire slit-formed portion (11) and first contact portion (110) to follow the position of the aspiration tube (30) with the elastic deformation of the elastic portion (15) also when the aspiration tube (30) is inserted while being displaced from the center of the slit (11*a*). Consequently, it may be possible to bring the protrusions (111) into contact with the peripheral surface (31) of the aspiration tube (30) also when the aspiration tube (30) that is inserted while being displaced from the center of the slit (11*a*) is withdrawn.

For example, as illustrated in FIG. 4, in this case, it may be preferable that the slit-formed portion (11) is connected to the elastic portion (15) to project to the bottom surface (22) side of the container main body (20). With this configuration, the slit-formed portion (11) is formed in a projecting form on the bottom surface (22) side of the container main body (20) in advance while the aspiration tube (30) is not inserted therein. Therefore, it may be possible to deform the slit-formed portion (11) by a great amount to the opening (21) side from the state of projecting form to the bottom surface (22) side when the aspiration tube (30) inserted in the slit (11*a*) is withdrawn. With this, since it is possible to secure a great deformation amount of the surface (11*c*) of the slit-formed portion (11) on the bottom surface (22) side, it may be possible to increase the movement amount of the protrusions (111) during the deformation of the surface (11*c*) of the slit-formed portion (11) on the bottom surface (22) side. Consequently, it may be possible to bring the protrusions (111) into contact with the peripheral surface (31) of the aspiration tube (30) more reliably.

For example, as illustrated in FIG. 6, in the configuration in which the protrusions (111) are moved toward the aspiration tube (30) along with the deformation of the slit-formed portion (11) when the aspiration tube (30) is withdrawn from the above-described slit (11*a*), it may be preferable that the protrusions (111) are moved in directions away from the aspiration tube (30) along with the deformation of the slit-formed portion (11) when the aspiration tube (30) is inserted into the slit (11*a*). With this configuration, since the slit-formed portion (11) is deformed to be dragged to the bottom surface (22) side when the aspiration tube (30) is inserted into the slit (11*a*), it may be possible to move the protrusions (111) in the directions away from the aspiration tube (30) to avoid the contact with the aspiration tube (30). With this, since it is possible to inhibit a sliding resistance when the aspiration tube (30) is inserted into the specimen container (100), it may be possible to insert the aspiration tube (30) in the specimen container (100) easily during the aspiration of the specimen.

For example, as illustrated in FIG. 16, in the specimen container (100) according to the above-described first aspect, it may be preferable that the contact portion (12) includes a second contact portion (120) arranged on the opening (21) side of the slit-formed portion (11) in the passing direction of the aspiration tube (30). With this configuration, it may be possible to remove the specimen attached to a portion passing through the slit (11*a*) when the aspiration tube (30) is withdrawn from the specimen container (100). With the second contact portion (120), it may be possible to inhibit the scattering of the specimen attached to the slit (11*a*) to the outside of the opening (21) when the aspiration tube (30) is withdrawn from the slit (11*a*), and the clearance of the slit (11*a*) is closed.

For example, as illustrated in FIG. 16, in this case, it is preferable that the second contact portion (120) is formed of an absorbent material. With this configuration, it may be possible to absorb the specimen attached to the aspiration tube (30) and to remove the specimen from the peripheral surface (31) of the aspiration tube (30).

For example, as illustrated in FIG. 16, in the configuration in which the contact portion (12) includes the second contact portion (120), it may be preferable that the second contact portion (120) includes a penetrating channel portion (121) that allows the aspiration tube (30) to pass therethrough in contact therewith. With this configuration, it may be possible to wipe off the specimen attached to the peripheral surface (31) of the aspiration tube (30) by an inner surface of the channel portion (121) in a process in which the aspiration tube (30) passes through the channel portion (121) of the second contact portion (120). Consequently, it may be possible to effectively inhibit the specimen from remaining on the peripheral surface (31) of the aspiration tube (30).

For example, as illustrated in FIG. 16, in this case, it may be preferable that the container main body (20) is in a cylindrical shape including the bottom surface (22) on the opposite side from the opening (21), the cap (10) includes a cylindrical portion (13) extending from the slit-formed portion (11) toward the opening (21) and a locking portion (16) projecting from the cylindrical portion (13) toward the center axis of the opening (21), and the second contact portion (120) is arranged between the slit-formed portion (11) and the locking portion (16) inside the cylindrical portion (13) and is formed with a clearance (CL) between the cylindrical portion (13) and the second contact portion (120) so as to be movable in the cylindrical portion (13). With this configuration, it may be possible to store the second contact portion (120) inside the cap (10). Therefore, for example, comparing with the configuration in which the second contact portion (120) is attached to the container main body (20) separately from the cap (10), it may be possible to simplify the structure of the specimen container (100). Since the second contact portion (120) can be moved in the cylindrical portion (13) by the width of the clearance (CL) between the cylindrical portion (13) and the second contact portion (120), it may be possible to move the second contact portion (120) to follow the position displacement of the aspiration tube (30) also when the aspiration tube (30) is inserted while being displaced from the center of the slit (11*a*).

For example, as illustrated in FIG. 20, it may be preferable that the specimen container (100) according to one or more embodiments further includes a cap cover (40) arranged on the container main body (20) to cover the cap (10), in which the cap cover (40) includes a peripheral wall portion (41) arranged to surround a periphery of the container main body (20). With this configuration, it may be possible to easily attach and remove the cap (10) by grasping the peripheral wall portion (41) of the cap cover (40).

For example, as illustrated in FIG. 21, in this case, it may be preferable that the specimen container (100) further includes a piston (60) provided in the container main body (20) and that slides in the container main body (20) and a piston rod (61) connected to the piston (60) and projecting from the bottom surface (22) of the container main body (20), in which a cut (62) that allows the piston rod (61) to be broken and removed from the piston (60) is provided in the piston rod (61) in the vicinity of the piston (60), and a tube portion (80) that is inserted into the slit (11*a*) of the cap (10) is attachable to the cap cover (70). With this configuration, it may be possible to easily introduce the specimen into the container main body (20) inside the slit (11*a*) through the tube portion (80) by withdrawing the piston rod (61) to move the piston (60) to the bottom surface (22) side of the container. It may be possible to inhibit the piston rod (61) from being obstructive by breaking and removing the piston rod (61) in the vicinity of the piston (60) after the piston rod (61) is withdrawn, and the specimen is introduced.

A cap (10) according to one or more embodiments, for example, as illustrated in FIG. 1, a cap (10) for a specimen container (100) that is arranged to close an opening (21) of a container main body (20) and includes a slit (11*a*) formed to allow an aspiration tube (30) to pass therethrough, including: a slit-formed portion (11) in which the slit (11*a*) is formed; and a contact portion (12) provided in a position different from that of the slit (11*a*) and that is brought into contact with a peripheral surface (31) of the aspiration tube (30) at least when the aspiration tube (30) is withdrawn from the slit (11*a*).

In the cap (10) according to one or more embodiments, as described above, not only the slit (11*a*) formed in the slit-formed portion (11) of the cap (10) but also the contact portion (12) provided in a position different from that of the slit (11*a*) is brought into contact with the peripheral surface (31) of the aspiration tube (30) at least when the aspiration tube (30) is withdrawn from the slit (11*a*). Therefore, during the withdrawal of the aspiration tube (30), the specimen attached to the peripheral surface (31) of the aspiration tube (30) is removed not only by the contact between the aspiration tube (30) and the inner surface of the slit (11*a*) but also by the contact between the aspiration tube (30) and the contact portion (12). Consequently, it may be possible to inhibit the specimen attached to the peripheral surface (31) of the aspiration tube (30) from remaining thereon after the aspiration tube (30) that aspirates the specimen is withdrawn from the specimen container (100). With the above configuration, it may be possible to inhibit the specimen from remaining on the surface of the aspiration tube (30) after the withdrawal from the specimen container (100).

For example, as illustrated in FIG. 5, in the cap (10) according to one or more embodiment , it may be preferable that the contact portion (12) is arranged to surround the center of the slit (11*a*) as viewed in the passing direction of the aspiration tube (30). With this configuration, it may be possible to arrange the contact portion (12) to surround the aspiration tube (30) inserted in the slit (11*a*). Therefore, it may be possible to remove the specimen attached to the aspiration tube (30) over a wider range in a circumferential direction of the peripheral surface (31) of the aspiration tube (30). Therefore, it may be possible to effectively inhibit the specimen from remaining on the surface of the aspiration tube (30).

For example, as illustrated in FIG. 4, in the cap (10) according to one or more embodiments, it may be preferable that the contact portion (12) includes a first contact portion (110) provided on a surface (11*c*) in the slit-formed portion (11) on a bottom surface (22) side of the container main body (20). With this configuration, when the aspiration tube (30) is withdrawn from the slit (11*a*), a region of the aspiration tube (30) to which the specimen is attached reaches the first contact portion (110) first, and after the attached specimen is removed, the region reaches the slit-formed portion (11). Therefore, it may be possible to inhibit the specimen attached to the aspiration tube (30) from being removed by the slit (11*a*). If the specimen is removed by the slit (11*a*), the specimen is attached to the portion of the slit (11*a*) of the slit-formed portion (11). With the aspiration tube (30) being inserted into the slit (11*a*), the slit (11*a*) is pushed and expanded, and a clearance is formed, and with the aspiration tube (30) being withdrawn therefrom, the slit (11*a*) is restored, and the clearance is closed. Therefore, if the specimen is attached to the portion of the slit (11*a*), the specimen attached to the slit (11*a*) may be scattered when the aspiration tube (30) is withdrawn from the slit (11*a*), and the clearance is closed. With the above-described configuration, since it is possible to inhibit the specimen attached to the aspiration tube (30) from being removed by the slit (11*a*), it may be possible to inhibit the specimen attached to the slit (11*a*) from being scattered.

For example, as illustrated in FIG. 7, in this case, it may be preferable that the first contact portion (110) includes protrusions (111) arranged around the center of the slit (11*a*) and the protrusions (111) are moved toward the aspiration tube (30) along with deformation of the slit-formed portion (11) when the aspiration tube (30) is withdrawn from the slit (11*a*). With this configuration, the slit-formed portion (11) is deformed to be dragged to the opening (21) side due to a friction between the aspiration tube (30) and the slit-formed portion (11) during the withdrawal of the aspiration tube (30). With use of the deformation of the slit-formed portion (11), it may be possible to move the protrusions (111) toward the aspiration tube (30) to push the protrusions (111) against the peripheral surface (31) of the aspiration tube (30). Consequently, it may be possible to remove the specimen attached to the aspiration tube (30) more reliably.

For example, as illustrated in FIG. 7, in the configuration in which the protrusions (111) are moved toward the aspiration tube (30) along with the deformation of the slit-formed portion (11) when the aspiration tube (30) is withdrawn from the above-described slit (11*a*), it may be preferable that in the slit-formed portion (11), the surface (11*c*) on the bottom surface (22) side is deformed to the opening (21) side due to sliding on the aspiration tube (30) in the slit (11*a*), and the protrusions (111) bring tip portions (112) thereof into contact with the peripheral surface (31) of the aspiration tube (30) by bending over to the aspiration tube (30) side along with the deformation of the slit-formed portion (11) to the opening (21) side. With this configuration, with the slit-formed portion (11) being dragged to the opening (21) side due to the friction with the aspiration tube (30), the surface (11*c*) of the slit-formed portion (11) on the bottom surface (22) side is tilted to be close to the peripheral surface (31) of the aspiration tube (30) while the aspiration tube (30) is centered. Therefore, it may be possible to bend the protrusions (111) provided on the surface (11*c*) of the slit-formed portion (11) on the bottom surface (22) side to be tilted to the aspiration tube (30) side and to press the protrusions (111) against the aspiration tube (30). Thus, with use of the deformation of the slit-formed portion (11) during the withdrawal of the aspiration tube (30), it may be possible to bring the first contact portion (110) into contact with the aspiration tube (30) more reliably with a simple structure.

For example, as illustrated in FIG. 11, in this case, it may be preferable that the slit-formed portion (11) includes sections (11*b*) divided by the slit (11*a*), and the number of the protrusions (111) is greater than the number of the sections (11*b*). With this configuration, it may be possible to remove the specimen attached to the aspiration tube (30) by the protrusions (111) of the number greater than the number of the sections (11*b*) with which the aspiration tube (30) is brought into contact while passing through the slit (11*a*). Therefore, it may be possible to remove the specimen attached to the aspiration tube (30) more effectively.

For example, as illustrated in FIG. 9, in the configuration in which the protrusions (111) are moved toward the aspiration tube (30) along with the deformation of the slit-formed portion (11) when the aspiration tube (30) is withdrawn from the above-described slit (11*a*), it may be preferable that, the protrusions (111) form the first contact portion (110) in a ring shape with tip portions (112) of adjacent ones of the protrusions (111) being brought into contact with each other along with the deformation of the slit-formed portion (11) during the withdrawal of the aspiration tube (30), and an inner diameter of the ring-shaped first contact portion (110) coincides with an outer diameter of the aspiration tube (30). With this configuration, with the protrusion (111) portions being adjacent to each other to form the ring-shaped first contact portion (110) and being pushed against the peripheral surface (31) of the aspiration tube (30), the inner diameter of the ring-shaped first contact portion (110) coincides with the outer diameter of the aspiration tube (30). Consequently, the first contact portion (110) can be brought into contact with the peripheral surface (31) of the aspiration tube (30) over the entire periphery in the circumferential direction, and thus it may be possible to more effectively inhibit the specimen attached to the aspiration tube (30) from remaining thereon.

For example, as illustrated in FIG. 4, in the configuration in which the protrusions (111) are moved toward the aspiration tube (30) along with the deformation of the slit-formed portion (11) when the aspiration tube (30) is withdrawn from the above-described slit (11*a*), it may be preferable that the cap (10) further includes an elastic portion (15) provided to surround the slit-formed portion (11) and the first contact portion (110) and that is elastically deformed to movably support the slit-formed portion (11) and the first contact portion (110). With this configuration, tensile deformation of the elastic portion (15) occurs due to the friction from the withdrawal of the aspiration tube (30) inserted in the slit (11*a*), and the elastic portion (15) moves the entire slit-formed portion (11) and first contact portion (110) to the opening (21) side. Since the movement amount of the slit-formed portion (11) and the first contact portion (110) is increased by the elastic portion (15), it may be possible to tilt the surface (11*c*) of the slit-formed portion (11) on the bottom surface (22) side in which the protrusions (111) are provided by a great amount. Consequently, since it is possible to increase the movement amount of the protrusions (111), it may be possible to bring the protrusions (111) into contact with the peripheral surface (31) of the aspiration tube (30) more reliably. It is possible to move the entire slit-formed portion (11) and first contact portion (110) to follow the position of the aspiration tube (30) with the elastic deformation of the elastic portion (15) also when the aspiration tube (30) is inserted while being displaced from the center of the slit (11*a*). Consequently, it may be possible to bring the protrusions (111) into contact with the peripheral surface (31) of the aspiration tube (30) also when the aspiration tube (30) that is inserted while being displaced from the center of the slit (11*a*) is withdrawn.

For example, as illustrated in FIG. 4, in this case, it may be preferable that the slit-formed portion (11) is connected to the elastic portion (15) to project to the bottom surface (22) side of the container main body (20). With this configuration, the slit-formed portion (11) is formed in a projecting form on the bottom surface (22) side of the container main body (20) in advance while the aspiration tube (30) is not inserted therein. Therefore, it may be possible to deform the slit-formed portion (11) by a great amount to the opening (21) side from the state of projecting form to the bottom surface (22) side when the aspiration tube (30) inserted in the slit (11*a*) is withdrawn. With this, since it is possible to secure a great deformation amount of the surface (11*c*) of the slit-formed portion (11) on the bottom surface (22) side, it may be possible to increase the movement amount of the protrusions (111) during the deformation of the surface (11*c*) of the slit-formed portion (11) on the bottom surface (22) side. Consequently, it may be possible to bring the protrusions (111) into contact with the peripheral surface (31) of the aspiration tube (30) more reliably.

For example as illustrated in FIG. 6, in the configuration in which the protrusions (111) are moved toward the aspiration tube (30) along with the deformation of the slit-formed portion (11) when the aspiration tube (30) is withdrawn from the above-described slit (11*a*), it may be preferable that the protrusions (111) are moved in directions away from the aspiration tube (30) along with the deformation of the slit-formed portion (11) when the aspiration tube (30) is inserted into the slit (11*a*). With this configuration, since the slit-formed portion (11) is deformed to be dragged to the bottom surface (22) side when the aspiration tube (30) is inserted into the slit (11*a*), it may be possible to move the protrusions (111) in the directions away from the aspiration tube (30) to avoid the contact with the aspiration tube (30). With this, since it is possible to inhibit a sliding resistance when the aspiration tube (30) is inserted into the specimen container (100), it may be possible to insert the aspiration tube (30) in the specimen container (100) easily during the aspiration of the specimen.

For example, as illustrated in FIG. 16, in the cap (10) according to the above-described second aspect, it may be preferable that the contact portion (12) includes a second contact portion (120) arranged on the opening (21) side of the slit-formed portion (11) in the passing direction of the aspiration tube (30). With this configuration, it may be possible to remove the specimen attached to a portion passing through the slit (11*a*) when the aspiration tube (30) is withdrawn from the specimen container (100). With the second contact portion (120), it may be possible to inhibit the scattering of the specimen attached to the slit (11*a*) to the outside of the opening (21) when the aspiration tube (30) is withdrawn from the slit (11*a*), and the clearance of the slit (11*a*) is closed.

For example, as illustrated in FIG. 16, in this case, it may be preferable that the second contact portion (120) is formed of an absorbent material. With this configuration, it may be possible to absorb the specimen attached to the aspiration tube (30) and to remove the specimen from the peripheral surface (31) of the aspiration tube (30).

For example, as illustrated in FIG. 16, in the configuration in which the contact portion (12) includes the second contact portion (120), it may be preferable that the second contact portion (120) includes a penetrating channel portion (121) that allows the aspiration tube (30) to pass therethrough in contact therewith. With this configuration, it may be possible to wipe off the specimen attached to the peripheral surface (31) of the aspiration tube (30) by an inner surface of the channel portion (121) in a process in which the aspiration tube (30) passes through the channel portion (121) of the second contact portion (120). Consequently, it may be possible to effectively inhibit the specimen from remaining on the peripheral surface (31) of the aspiration tube (30).

For example, as illustrated in FIG. 16, in this case, it may be preferable that the cap (10) further includes: a cylindrical portion (13) extending from the slit-formed portion (11) toward the opening (21); and a locking portion (16) projecting from the cylindrical portion (13) toward the center axis of the opening (21), in which the second contact portion (120) is arranged between the slit-formed portion (11) and the locking portion (16) inside the cylindrical portion (13) and is formed with a clearance (CL) between the cylindrical portion (13) and the second contact portion (120) so as to be movable in the cylindrical portion (13). With this configuration, it may be possible to store the second contact portion (120) inside the cap (10). Therefore, for example, comparing with the configuration in which the second contact portion (120) is attached to the container main body (20) separately from the cap (10), it may be possible to simplify the structure of the specimen container (100). Since the second contact portion (120) can be moved in the cylindrical portion (13) by the width of the clearance (CL) between the cylindrical portion (13) and the second contact portion (120), it may be possible to move the second contact portion (120) to follow the position displacement of the aspiration tube (30) also when the aspiration tube (30) is inserted while being displaced from the center of the slit (11*a*).

According to a specimen container and a cap according to one or more embodiments, It may be possible to inhibit a specimen from remaining on a surface of an aspiration tube after the withdrawal from a specimen container.

DETAILED DESCRIPTION

Hereinafter, one or more embodiments are described with reference to the drawings.

Configuration of Specimen Container

A specimen container 100 according to this embodiment is described with reference to FIGS. 1 and 2.

The specimen container 100 is a container for storing a specimen 90. The specimen container 100 stores the specimen 90 that is measured by a measuring apparatus. The specimen 90 is derived from living organism such as urine, blood, and cell, for example. The specimen container 100 stores a liquid as the specimen 90. The specimen container 100 may store powder as the specimen 90.

Figure 1:
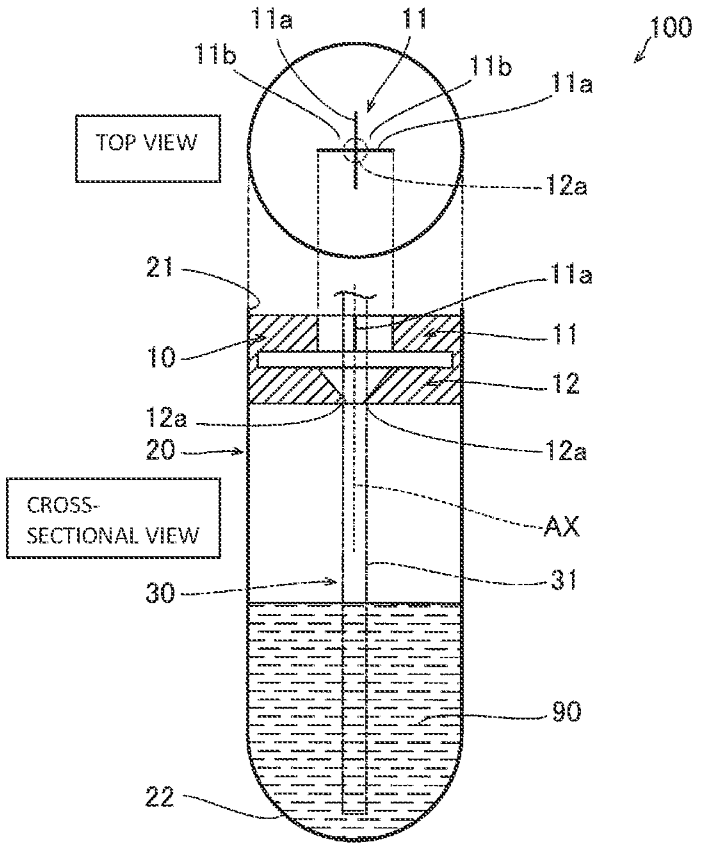
FIG. 1 is a schematic diagram illustrating a top view and a longitudinal cross-sectional view of an example of a specimen container.
Figure 2:
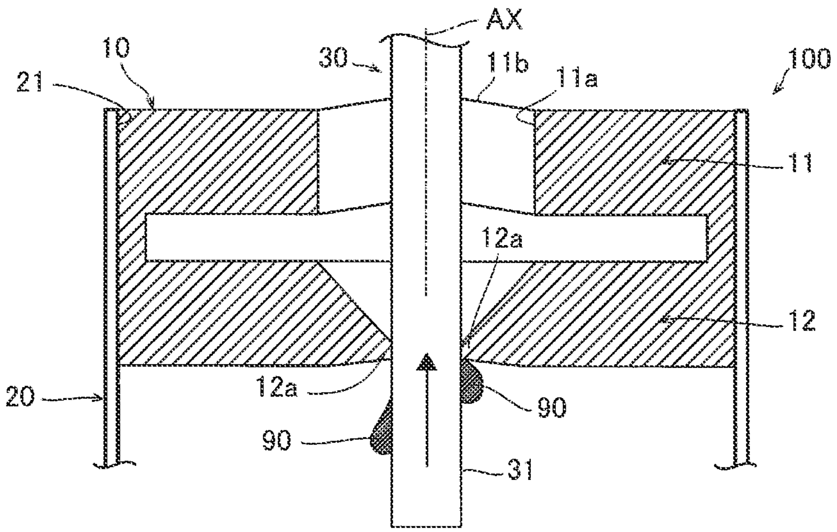
FIG. 2 is a schematic diagram illustrating an enlarged cross-sectional view of a contact portion in the specimen container.

As illustrated in FIGS. 1 and 2, an aspiration tube 30 (dashed-dotted line portion) of the measuring apparatus is inserted into the specimen container 100. The aspiration tube 30 aspirates the specimen 90 in the specimen container 100. With this, the specimen 90 is taken into the measuring apparatus, and the measuring is performed. After the specimen 90 is aspirated, the aspiration tube 30 is cleaned with a cleaning liquid in the measuring apparatus.

The specimen container 100 includes a cap 10 and a container main body 20. The container main body 20 includes an opening 21. The cap 10 is arranged to close the opening 21 of the container main body 20. The cap 10 includes a slit-formed portion 11 in which a slit 11*a* that allows the aspiration tube 30 to pass therethrough is formed. The cap 10 includes a contact portion 12 provided in a position different from that of the slit 11*a*. The contact portion 12 is configured to be brought into contact with a peripheral surface 31 of the aspiration tube 30 at least when the aspiration tube 30 is withdrawn from the slit 11*a*.

The slit-formed portion 11 is formed as a part of the cap 10. In the example of FIG. 1, the slit-formed portion 11 is formed to close the opening 21. The slit-formed portion 11 has a plate-like shape or a film-like shape. In the slit-formed portion 11, at least the portion of the slit 11*a* is elastically deformable by pressing force from the aspiration tube 30. The slit-formed portion 11 is formed of a rubber material such as silicon, for example.

The slit 11*a* is a cut penetrating the slit-formed portion 11 in a thickness direction. The slit 11*a* provides a channel for the aspiration tube 30 in the cap 10. The slit 11*a* divides the slit-formed portion 11 into sections 11*b*. The slit 11*a* is a clearance between the divided sections 11*b*.

The slit 11*a* is formed such that the clearance is closed when the aspiration tube 30 is not inserted. That is, when the aspiration tube 30 is not inserted, the slit 11*a* is closed with the sections 11*b* being brought into contact with each other. While the slit 11*a* is closed, the slit-formed portion 11 seals the specimen container 100. In this specification, the phrase "seal the specimen container" means a state where the specimen 90 cannot pass through the slit 11*a* while a little amount of gas other than the specimen 90 is allowed to pass therethrough. The shape of the slit 11*a* may be anything as long as the aspiration tube 30 is able to pass therethrough. For example, in the example illustrated in FIG. 1, the slit 11*a* is formed in a cross shape in the slit-formed portion 11. The slit 11*a* is formed such that the center of the opening 21 and the center of the slit 11*a* substantially coincide with each other in plan view.

The aspiration tube 30 is inserted in the position in which the slit 11*a* is formed. With the aspiration tube 30 pressing the sections 11*b* downward, the sections 11*b* are elastically deformed. With the elastic deformation of the sections 11*b*, the slit 11*a* is opened in plan view, and the slit 11*a* is pushed and expanded to a size that allows the aspiration tube 30 to pass therethrough. With the aspiration tube 30 being moved downward, the aspiration tube 30 enters the inside of the container main body 20 through the inside of the enlarged slit 11*a*. The aspiration tube 30 is moved until the aspiration tube 30 is brought into contact with the specimen 90 inside the container main body 20 and aspirates the specimen 90. After the aspiration of the specimen 90, the aspiration tube 30 is moved upward. When a tip of the aspiration tube 30 escapes upward from the inside of the slit 11*a*, the slit 11*a* is closed by restoring force of the elastically deformed sections 11*b*.

The contact portion 12 is provided in a position in which the contact portion 12 is able to be brought into contact with the aspiration tube 30 inserted in the slit 11*a*. The contact portion 12 may be integrally formed with the slit-formed portion 11 or may be separately formed as a separate part from the slit-formed portion 11. When the contact portion 12 is provided as a separate part from the slit-formed portion 11, the contact portion 12 is held by the cap 10 or the container main body 20.

The contact portion 12 may be arranged on an opening 21 side of the slit 11*a* or may be arranged on a bottom surface 22 side of the container main body 20 of the slit 11*a*. If the contact portion 12 is provided in the slit-formed portion 11, the position of the contact portion 12 may be changed with the elastic deformation of the slit-formed portion 11 during the insertion of the aspiration tube 30. The contact portion 12 is arranged in the position in which the contact portion 12 is brought into contact with the peripheral surface 31 of the aspiration tube 30 at least during the withdrawal of the aspiration tube 30 even if the position of the contact portion 12 is changed with the insertion of the aspiration tube 30. In the example of FIG. 1, the contact portion 12 is arranged away from the slit 11*a* and closer to the bottom surface 22 side of the container main body 20 than the slit 11*a* is. Therefore, the contact portion 12 is not affected by the elastic deformation of the slit-formed portion 11.

The contact portion 12 is brought into contact with the peripheral surface 31 of the aspiration tube 30 over a part or the entire periphery in a circumferential direction. One or more contact portions 12 are provided in the cap 10. A portion of the contact portion 12 that is brought into contact with the aspiration tube 30 may be elastically deformable by the pressing force from the aspiration tube 30. The contact portion 12 may be formed of a rubber material such as silicon, for example. With this, it is possible to effectively attach the contact portion 12 closely to the peripheral surface 31 of the aspiration tube 30.

In the example of FIG. 1, the contact portion 12 has a flat plate shape as with the slit-formed portion 11. The contact portion 12 extends to project from a periphery side toward a center axis AX of the opening 21. The contact portion 12 is formed such that an interval between tips 12*a* on the center axis AX side of the opening 21 is equal to or smaller than an outer diameter of the aspiration tube 30. In the contact portion 12, for example, the tips 12*a* may be formed in a circular shape in plan view, and the tips 12*a* in a circular shape may form a through-hole that allows the aspiration tube 30 to pass therethrough while sliding thereon.

In the example of FIG. 1, when the tip of the aspiration tube 30 enters the inside of the container main body 20 through the inside of the slit 11*a*, the aspiration tube 30 is brought into contact with the tips 12*a* of the contact portion 12. The aspiration tube 30 enters the inside of the container main body 20 while elastically deforming the contact portion 12. The contact portion 12 is pressed against the peripheral surface 31 of the aspiration tube 30. The contact portion 12 maintains the contact with the peripheral surface 31 of the aspiration tube 30 also during the withdrawal of the aspiration tube 30 after the aspiration of the specimen 90. The aspiration tube 30 is moved upward while sliding on the contact portion 12.

As illustrated in FIG. 2, when the aspiration tube 30 is withdrawn upward from the inside of the slit 11*a*, the specimen 90 attached to the peripheral surface 31 of the aspiration tube 30 is wiped off by the contact portion 12 once the specimen 90 reaches the position of the contact portion 12 in contact with the peripheral surface 31. Therefore, when the aspiration tube 30 passes through the position in which the contact portion 12 is formed, the specimen 90 attached to the peripheral surface 31 of the aspiration tube 30 is removed.

If there is the specimen 90 attached to the peripheral surface 31 of the aspiration tube 30 when the aspiration tube 30 is withdrawn upward from the inside of the slit 11*a*, some of the attached specimen 90 may be removed by the portion of the slit 11*a*. In the portion in which the peripheral surface 31 of the aspiration tube 30 and the inner surface of the slit 11*a* are brought into contact with each other, the specimen 90 is removed and attached to the sections 11*b*. However, since the slit 11*a* is enlarged by being pushed and expanded by the aspiration tube 30, a part of the slit 11*a* is not brought into contact with the peripheral surface 31 of the aspiration tube 30. In the portion in which the peripheral surface 31 of the aspiration tube 30 and the inner surface of the slit 11*a* are not brought into contact with each other, the specimen 90 is not removed by the slit 11*a*. Thus, the slit 11*a* is required to have a function of closing the opening 21 while the aspiration tube 30 is not inserted, but the contact portion 12 is not required to close the opening 21. Therefore, it is possible to adopt a shape for the contact portion 12 that is suitable to remove the specimen 90 attached to the aspiration tube 30.

The contact portion 12 may have a mutually complementary relationship with the slit 11*a*. For example, the contact portion 12 may be provided to be brought into contact with a portion of the peripheral surface 31 of the aspiration tube 30 that is not brought into contact with the inner surface of the slit 11*a*. The slit 11*a* may be provided to be brought into contact with a portion of the peripheral surface 31 of the aspiration tube 30 that is not brought into contact with the contact portion 12.

As described above, not only the slit 11*a* formed in the cap 10 but also the contact portion 12 provided in the position different from that of the slit 11*a* is brought into contact with the peripheral surface 31 of the aspiration tube 30 at least when the aspiration tube 30 is withdrawn from the slit 11*a*. Therefore, during the withdrawal of the aspiration tube 30, in addition to the removal of the specimen 90 attached to the peripheral surface 31 of the aspiration tube 30 with the contact between the aspiration tube 30 and the inner surface of the slit 11*a*, the specimen 90 attached to the peripheral surface 31 of the aspiration tube 30 is also removed with the contact between the aspiration tube 30 and the contact portion 12. Consequently, it is possible to inhibit the specimen 90 attached to the peripheral surface 31 of the aspiration tube 30 from remaining thereon after the aspiration tube 30 that aspirates the specimen 90 is withdrawn from the specimen container 100. With the above configuration, it is possible to inhibit the specimen 90 from remaining on the surface of the aspiration tube 30 after the withdrawal from the specimen container 100.

In the configuration example of FIGS. 1 and 2, the contact portion 12 is arranged to surround the center of the slit 11*a* as viewed in the passing direction of the aspiration tube 30. With this, it is possible to arrange the contact portion 12 to surround the aspiration tube 30 inserted in the slit 11*a*. Therefore, it is possible to remove the specimen 90 attached to the aspiration tube 30 over a wider range in the circumferential direction of the peripheral surface 31 of the aspiration tube 30. Therefore, it is possible to effectively inhibit the specimen 90 from remaining on the surface of the aspiration tube 30.

Configuration of Measuring Apparatus

Figure 3:
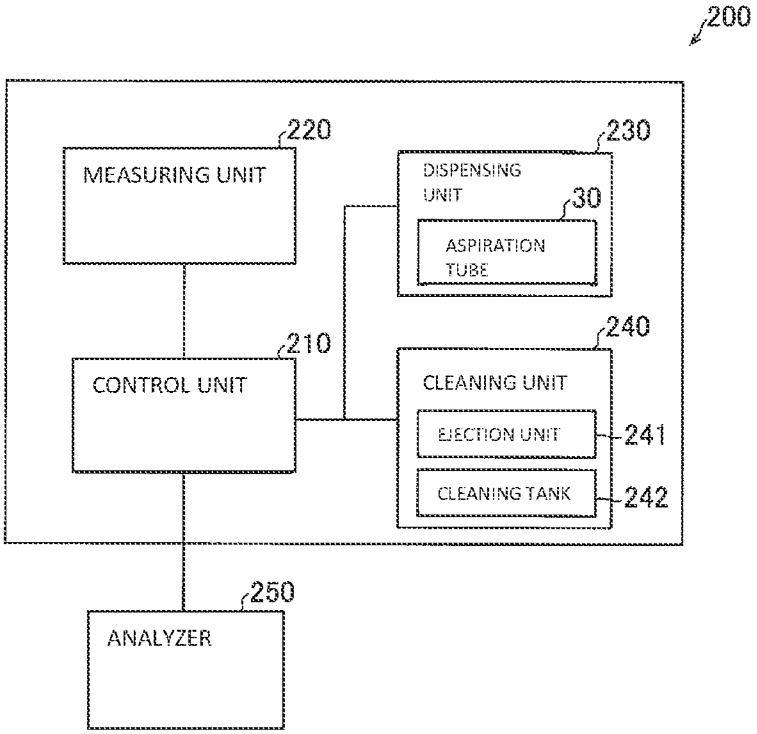
FIG. 3 is a block diagram for describing a measuring apparatus.

A configuration of a measuring apparatus 200 that measures the specimen 90 stored in the specimen container 100 is described with reference to FIG. 3.

The measuring apparatus 200 measures a urine sample as the specimen 90, for example. As illustrated in FIG. 3, the measuring apparatus 200 includes a control unit 210, a measuring unit 220, a dispensing unit 230, and a cleaning unit 240. The dispensing unit 230 is provided with the aspiration tube 30 that aspirates the specimen 90 from the specimen container 100.

The control unit 210 controls the units of the measuring apparatus 200. The control unit 210 controls measuring processing of the specimen 90 by the measuring apparatus 200. The control unit 210 includes a processing unit such as a CPU (central processing unit) and a storage unit such as a memory, for example. The control unit 210 executes the measuring processing based on a program. The control unit 210 transmits a measuring result to an analyzer 250 connected to the measuring apparatus 200.

The analyzer 250 analyzes information on components of the specimen 90 that are measured by the measuring apparatus 200. The components in the urine sample analyzed by the analyzer 250 are urine particles, for example. The urine particles are red blood cells, white blood cells, epithelial cells, casts, bacteria, atypical cells, and leucocyte agglutination, for example. The analyzer 250 may include a general-purpose computer, for example.

The measuring unit 220 measures the specimen 90 that is dispensed by the dispensing unit 230 from the specimen container 100. The measuring unit 220 includes a flow cytometer, for example. The flow cytometer optically measures the specimen 90 by flow cytometry technique. The measuring unit 220 irradiates the specimen 90 flowing in a cell with light and detects the light from the specimen 90 to perform the measuring. The measuring unit 220 performs the measuring of a prepared specimen that is prepared by adding a reagent to the specimen 90.

The dispensing unit 230 aspirates the urine sample from the specimen container 100 and dispenses the urine sample to the measuring unit 220. The aspiration tube 30 of the specimen container 100 may be integrally provided with two tubes. For example, the aspiration tube 30 may be integrally provided with two tubes, a tube for aspiration and a tube for agitation.

The cleaning unit 240 cleans the aspiration tube 30 after aspirating the urine sample from the specimen container 100. The cleaning unit 240 includes an ejection unit 241 that ejects the cleaning liquid to the aspiration tube 30 and a cleaning tank 242 that receives the ejected cleaning liquid, for example.

The control unit 210 controls the cleaning operation for the aspiration tube 30 by the cleaning unit 240 to inhibit carry-over of the urine sample to be within an allowable range. The control unit 210 controls the supply amount of the cleaning liquid, the cleaning time required to perform one cleaning operation, and the number of times of cleaning, for example, of the cleaning unit 240. Since the specimen container 100 using the cap 10 including the above-described contact portion 12 reduces the remaining amount of the specimen 90 attached to the peripheral surface 31 of the aspiration tube 30, it is possible to relax the conditions such as the cleaning capacity and cleaning time required for the cleaning processing for the aspiration tube 30 in the measuring apparatus 200. Specifically, according to the specimen container 100 using the cap 10 including the above-described contact portion 12, it is possible to reduce the supply amount of the cleaning liquid, shorten the cleaning time, and reduce the number of times of cleaning more than a case of not using the cap 10 including the contact portion 12.

Configuration Examples of Cap and Specimen Container

Configuration examples of the cap 10 and the specimen container 100 according to this embodiment are described.

Figure 4:
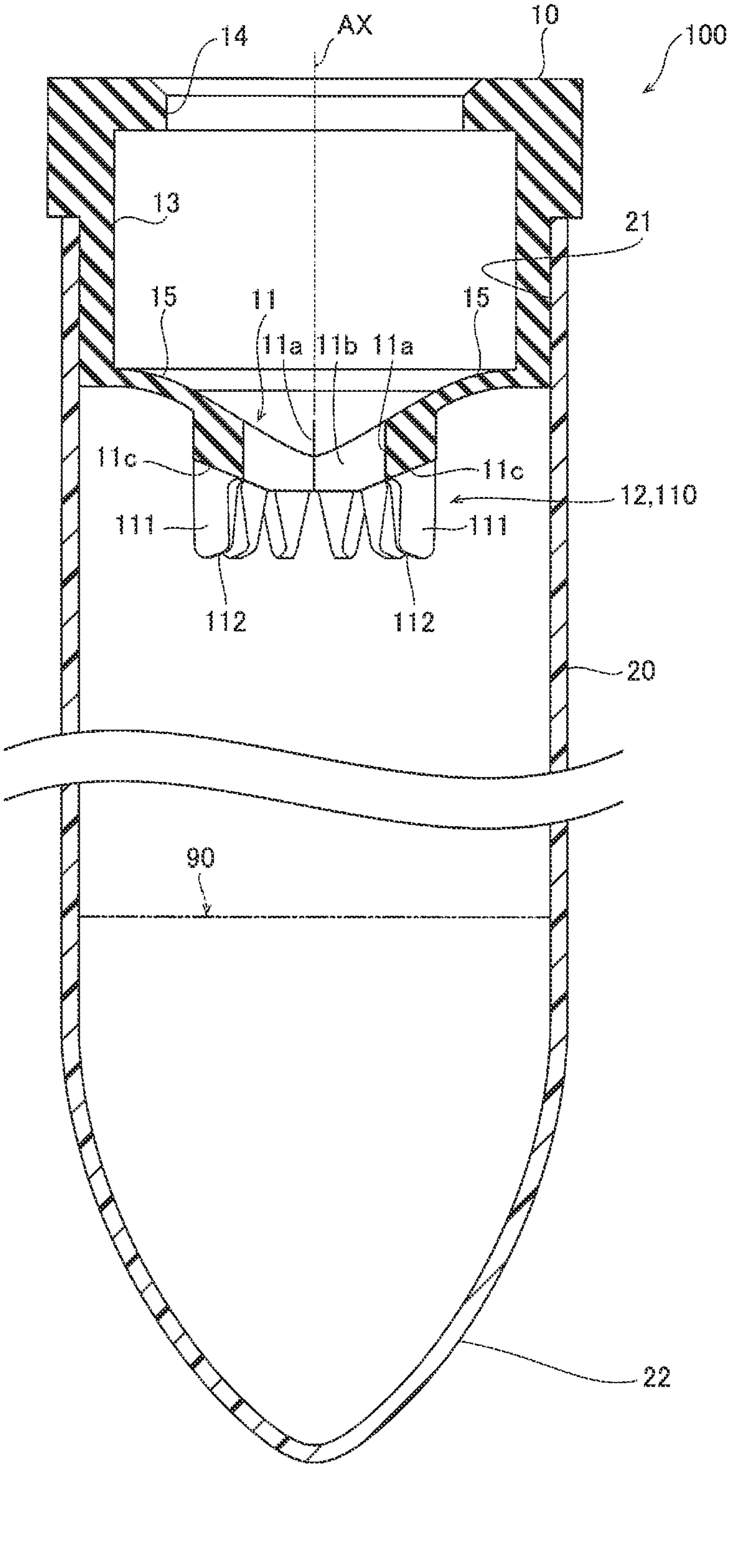
FIG. 4 is a diagram illustrating a longitudinal cross-sectional view of the specimen container.

In the configuration example of FIG. 4, in the specimen container 100, the cap 10 is provided in the opening 21 of the container main body 20. The cap 10 seals the container main body 20 and includes the slit-formed portion 11 in which the slit 11*a* is formed such that the aspiration tube 30 is inserted therein. That is, in the cap 10, the aspiration tube is not inserted by piercing so as to inhibit the generation of waste rubber, and alternatively, the aspiration tube 30 is inserted through the slit 11*a*.

The cap 10 is formed of a rubber material. For example, the cap 10 is formed of silicon rubber. The cap 10 may be formed of a rubber material other than silicon rubber such as elastomer and EPDM (ethylene-propylene-diene) or a resin material. The cap 10 may be formed as an integral object by double-shot molding.

The container main body 20 has a cylindrical shape including the bottom surface 22 on the opposite side from the opening 21. In the example of FIG. 4, the container main body 20 has a cylinder shape extending linearly, and the opening 21 is formed in an upper end portion, and the closed bottom surface 22 is included on a lower end portion. The center axis of the cap 10, the center axis AX of the opening 21, and the center axis of the container main body 20 coincide with each other. The container main body 20 is able to store the urine specimen 90 therein. The container main body 20 is made of resin or glass, for example. The resin may be polystyrene, polypropylene, or the like, for example. The cap 10 is removably fitted in the opening 21 in the upper end portion of the container main body 20.

The cap 10 includes the above-described slit-formed portion 11 and a cylindrical portion 13 extending from the slit-formed portion 11 toward the opening 21. In the example of FIG. 4, the slit-formed portion 11 is arranged in a position closer to the bottom surface 22 side than the opening 21 is. The cylindrical portion 13 has a cylinder shape so as to be inserted in the container main body 20 and closely attached to the container inner wall. The cylindrical portion 13 is brought into contact with an inner periphery of the container main body 20. An upper portion of the cylindrical portion 13 is provided with an opening 14. An inner space is formed in the inside of the cylindrical portion 13.

First Contact Portion

In the example of FIG. 4, the contact portion 12 includes a first contact portion 110 provided on a surface 11*c* of the slit-formed portion 11 on the bottom surface 22 side. The first contact portion 110 is integrally formed with the slit-formed portion 11. With this, when the aspiration tube 30 is withdrawn from the slit 11*a*, a region of the aspiration tube 30 to which the specimen 90 is attached reaches the first contact portion 110 first, and after the specimen 90 is removed, the region reaches the slit-formed portion 11. Therefore, it is possible to inhibit the specimen 90 attached to the aspiration tube 30 from being removed by the slit 11*a*. The slit 11*a* is restored with the withdrawal of the aspiration tube 30, and the clearance is closed. Therefore, if the specimen 90 is attached to the portion of the slit 11*a*, the specimen 90 attached to the slit 11*a* may be scattered when the aspiration tube 30 is withdrawn from the slit 11*a*, and the clearance is closed. According to the first contact portion 110, since it is possible to inhibit the specimen 90 attached to the aspiration tube 30 from being removed by the slit 11*a*, it is possible to inhibit the specimen 90 attached to the slit 11*a* from being scattered.

Figure 5:
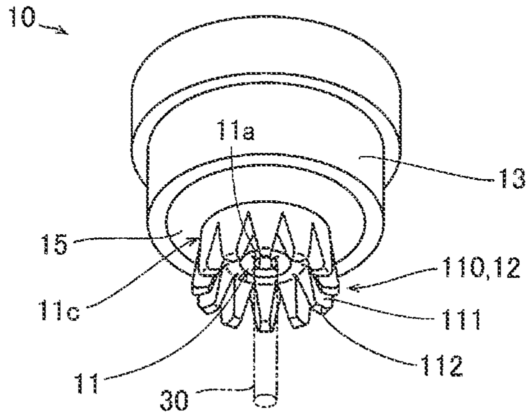
FIG. 5 is a diagram illustrating a perspective view of a cap when an aspiration tube is inserted.

As illustrated in FIG. 4, the first contact portion 110 includes protrusions 111 arranged around the center of the slit 11*a*. The protrusions 111 are provided to project from the surface 11*c* of the slit-formed portion 11 on the bottom surface 22 side to the bottom surface 22 side. As illustrated in FIG. 5, the protrusions 111 are arrayed in a ring shape to surround the slit 11*a* formed in the slit-formed portion 11.

The first contact portion 110 is configured such that the protrusions 111 are moved toward the aspiration tube 30 along with the deformation of the slit-formed portion 11 when the aspiration tube 30 is withdrawn from the slit 11*a*.

Figure 6:
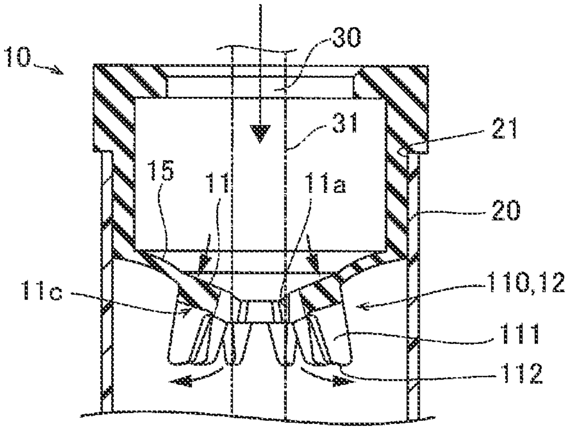
FIG. 6 is a diagram for describing the cap and the contact portion when the aspiration tube is inserted in the specimen container.
Figure 7:
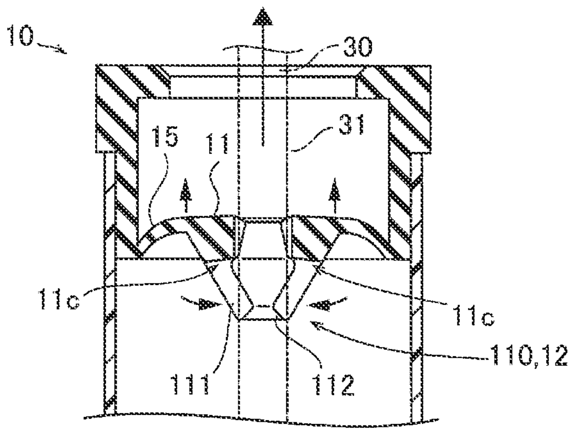
FIG. 7 is a diagram for describing the cap and the contact portion when the aspiration tube is withdrawn from the specimen container.
Figure 8:
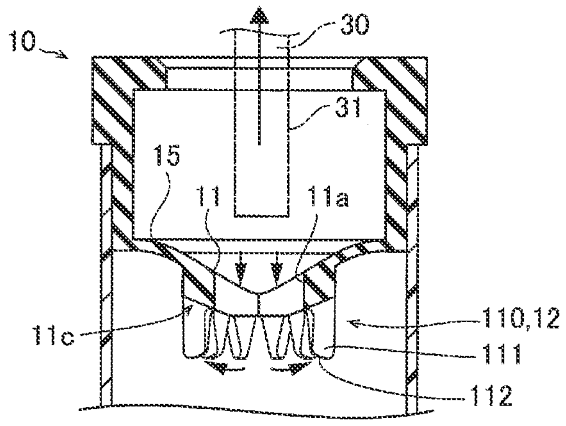
FIG. 8 is a diagram illustrating the cap and the contact portion after the aspiration tube is withdrawn from the specimen container.

FIGS. 6 to 8 illustrate the changes from when the aspiration tube 30 is inserted in the slit 11*a* (see FIG. 6) and then moved to be withdrawn upward from the inside of the slit 11*a* (see FIG. 7) to when the aspiration tube 30 is withdrawn upward from the inside of the slit 11*a* (see FIG. 8).

As illustrated in FIG. 6, during the insertion of the aspiration tube 30, the slit-formed portion 11 is pushed downward. In this process, the protrusions 111 are opened. In the state of FIG. 6, the specimen 90 inside the specimen container 100 is aspirated. FIG. 5 is a perspective view of the cap 10 in the state of FIG. 6.

Figure 9:
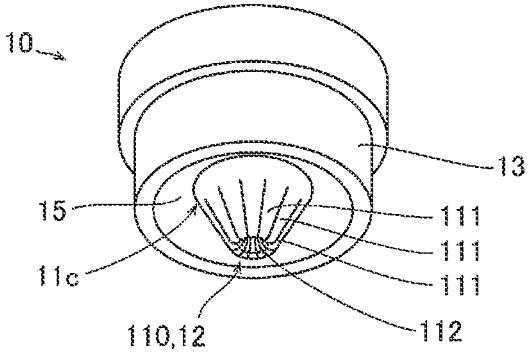
FIG. 9 is a diagram illustrating a perspective view of protrusions when the aspiration tube is withdrawn from the specimen container.
Figure 10:
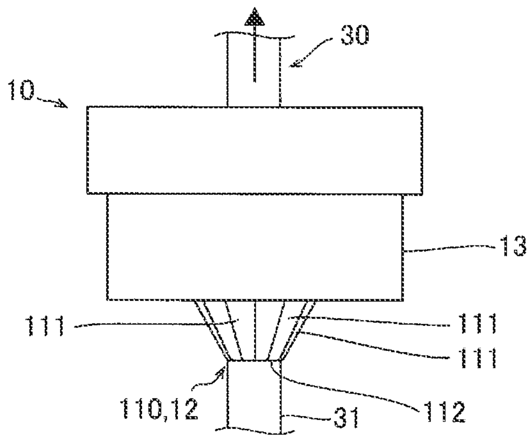
FIG. 10 is a diagram illustrating a side view of the protrusions and the aspiration tube when the aspiration tube is withdrawn from the specimen container.

As illustrated in FIG. 7, when the aspiration tube 30 is moved upward during the withdrawal, the slit-formed portion 11 is deformed as illustrated in FIG. 7. That is, the slit-formed portion 11 is deformed to be dragged to the opening 21 side due to a friction between the aspiration tube 30 and the slit-formed portion 11 during the withdrawal of the aspiration tube 30. Since the slit-formed portion 11 is dragged to the opening 21 side, the surface 11*c* on which the protrusions 111 are formed is raised upward and deformed to the opening 21 side. With this, during the withdrawal of the aspiration tube 30, the protrusions 111 are mutually closed. Specifically, the protrusions 111 are moved such that base portions bend over to the aspiration tube 30 side. Consequently, as illustrated in FIGS. 9 and 10, tip portions of the protrusions 111 are pressed against the peripheral surface 31 of the aspiration tube 30 and closely attached to the peripheral surface 31. FIG. 9 is a perspective view illustrating the state of FIG. 7 omitting the aspiration tube 30. FIG. 10 is a side view of the cap 10 in the state of FIG. 7.

As illustrated in FIG. 8, the aspiration tube 30 slides upward while being in contact with tip portions 112 of the protrusions 111, and eventually, the tip of the aspiration tube 30 is withdrawn from the slit 11*a*. The slit-formed portion 11 and the protrusions 111 are restored to the state illustrated in FIG. 4.

Thus, with the configuration in which the protrusions 111 are moved toward the aspiration tube 30 along with the deformation of the slit-formed portion 11 when the aspiration tube 30 is withdrawn from the slit 11*a*, it is possible to move the protrusions 111 toward the aspiration tube 30 and push the protrusions 111 against the peripheral surface 31 of the aspiration tube 30 by using the deformation of the slit-formed portion 11. Consequently, it is possible to remove the specimen 90 attached to the aspiration tube 30 more reliably.

As illustrated in FIG. 7, in the slit-formed portion 11, the surface 11*c* on the bottom surface 22 side is deformed to the opening 21 side due to the sliding on the aspiration tube 30 in the slit 11*a*. The protrusions 111 are configured to bend over to the aspiration tube 30 side along with the deformation of the slit-formed portion 11 to the opening 21 side, so as to bring the tip portions 112 thereof into contact with the peripheral surface 31 of the aspiration tube 30. With this, it is possible to bend the protrusions 111 provided on the surface 11*c* of the slit-formed portion 11 on the bottom surface 22 side to be tilted to the aspiration tube 30 side so as to press the protrusions 111 against the aspiration tube 30. Thus, with use of the deformation of the slit-formed portion 11 during the withdrawal of the aspiration tube 30, it is possible to bring the first contact portion 110 into contact with the aspiration tube 30 more reliably with a simple structure.

Figure 11:
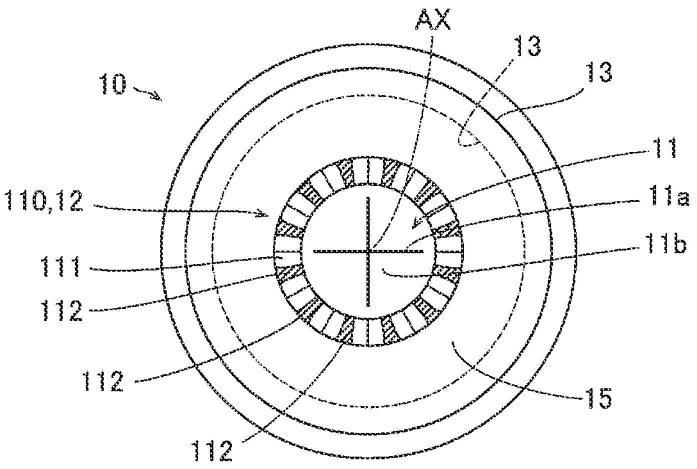
FIG. 11 is a schematic diagram illustrating a bottom view of the cap illustrating a slit and the protrusions.

In this embodiment, the number of the protrusions 111 is greater than the number of the sections 11*b*. Specifically, as illustrated in FIG. 11, the slit-formed portion 11 includes four sections 11*b* divided by the slit 11*a* in a cross shape. In the example of FIG. 11 (see FIG. 5 as well), the number of the protrusions 111 is 12, which is greater than the number of the sections 11*b*. With this, it is possible to remove the specimen 90 attached to the aspiration tube 30 by the protrusions 111 of the number greater than the number of the sections 11*b* with which the aspiration tube 30 is brought into contact while passing through the slit 11*a*. Therefore, it is possible to remove the specimen 90 attached to the aspiration tube 30 more effectively. In FIG. 11, for the sake of convenience, the tip portions 112 of the protrusions 111 are hatched. The 12 protrusions 111 are arranged at equiangular intervals to surround the slit 11*a*.

The number of the protrusions 111 is not limited to the illustration. The protrusions 111 may be 5 to 11 or may be 13 or more, for example. In the configuration in which the protrusions 111 are arrayed in a ring shape, it is favorable that the number N of the protrusions 111 is a divisor that equally divides 360 degrees into N. The number N is 8, 9, 10, 12, 15, 18, 20, or the like, for example.

The protrusions 111 are configured such that the tip portions 112 of adjacent ones of the protrusions 111 are brought into contact with each other to form the ring-shaped first contact portion 110 along with the deformation of the slit-formed portion 11 during the withdrawal of the aspiration tube 30. That is, in the state illustrated in FIG. 7, adjacent ones of the protrusions 111 are brought into contact with each other, and a clearance between the adjacent protrusions 111 is closed as illustrated in FIGS. 9 and 10. As a result, the ring-shaped first contact portion 110 in which the tip portions 112 of the protrusions 111 are continuous is formed.

Each protrusion 111 in the design is designed such that the tip portion 112 bends over on a position on the center side of the slit 11*a* over the peripheral surface 31 of the aspiration tube 30 that passes through the slit 11*a*. FIG. 7 illustrates that the tip portions 112 can be moved to the center side over the aspiration tube 30 indicated by a dashed-dotted line. Therefore, when the aspiration tube 30 inserted in the slit 11*a* is actually withdrawn, the tip portions 112 of the protrusions 111 are pushed against and closely attached to the peripheral surface 31 of the aspiration tube 30. As a result, an inner diameter of the ring-shaped first contact portion 110 coincides with an outer diameter of the aspiration tube 30. With this, the first contact portion 110 can be brought into contact with the peripheral surface 31 of the aspiration tube 30 over the entire periphery in the circumferential direction, and thus it is possible to more effectively inhibit the specimen 90 attached to the aspiration tube 30 from remaining thereon.

As illustrated in FIGS. 5 and 6, the protrusions 111 are configured to be moved in directions away from the aspiration tube 30 along with the deformation of the slit-formed portion 11 when the aspiration tube 30 is inserted into the slit 11*a*. Specifically, in the state of FIG. 4 where the aspiration tube 30 is not inserted in the slit 11*a*, the protrusions 111 project directly downward along the center axis AX of the specimen container 100. In the state of FIG. 6, the slit-formed portion 11 is deformed to be dragged to the bottom surface 22 side by the aspiration tube 30. That is, the surface 11*c* on which the protrusions 111 are formed is pushed downward more than that in the state of FIG. 4. Consequently, the protrusions 111 are moved radially outward, which is a direction in which the tip portions 112 are moved away from the aspiration tube 30.

With this, since the slit-formed portion 11 is deformed to be dragged to the bottom surface 22 side when the aspiration tube 30 is inserted into the slit 11*a*, it is possible to move the protrusions 111 in the directions away from the aspiration tube 30 to avoid the contact with the aspiration tube 30. Consequently, since it is possible to inhibit a sliding resistance when the aspiration tube 30 is inserted into the specimen container 100, it is possible to insert the aspiration tube 30 in the specimen container 100 easily during the aspiration of the specimen 90.

In order to move the protrusions 111 in accordance with the aspiration tube 30 as the above, it is effective to increase the deformation amount of the slit-formed portion 11 during the movement of the aspiration tube 30. That is, as the deformation amount of the slit-formed portion 11 from the normal state of FIG. 4 to the state of FIG. 7 is greater, it is possible to increase the tilt angle of the surface 11*c* and move the protrusions 111 to the aspiration tube 30 side by a greater amount.

In the configuration example of FIG. 4, the cap 10 includes an elastic portion 15 that is elastically deformed and movably supports the slit-formed portion 11 and the first contact portion 110. The elastic portion 15 is provided to surround the slit-formed portion 11 and the first contact portion 110. The elastic portion 15 couples the cylindrical portion 13 and slit-formed portion 11 with each other.

The elastic portion 15 is integrally formed with the slit-formed portion 11. The elastic portion 15 has a smaller thickness than that of the slit-formed portion 11. With this, the elastic portion 15 is formed to be elastically deformed easier than the slit-formed portion 11 is.

For example, the elastic portion 15 has a thickness $1/1.5$ or more times smaller than the thickness of the slit-formed portion 11. The elastic portion 15 preferably has a width $1/8$ or more times greater and $1/1.5$ or more times smaller than the width of the slit-formed portion 11. For example, the elastic portion 15 has a thickness that is about $1/2.5$ times smaller than the thickness of the slit-formed portion 11. The elastic portion 15 has a width that is about $1/3$ times smaller than the width of the slit-formed portion 11.

The elastic portion 15 may be formed of a material of a lower elastic modulus than that of the slit-formed portion 11. This also makes it possible to elastically deform the elastic portion 15 more easily than the case of the slit-formed portion 11.

With this, tensile deformation of the elastic portion 15 occurs due to the friction from the withdrawal of the aspiration tube 30 inserted in the slit 11*a*, and the elastic portion 15 moves the entire slit-formed portion 11 and first contact portion 110 to the opening 21 side. Since the movement amount of the slit-formed portion 11 and the first contact portion 110 is increased by the elastic portion 15, it is possible to tilt the surface 11*c* of the slit-formed portion 11 on the bottom surface 22 side in which the protrusions 111 are provided by a great amount. Consequently, since it is possible to increase the movement amount of the protrusions 111, it is possible to bring the protrusions 111 into contact with the peripheral surface 31 of the aspiration tube 30 more reliably.

Figure 12:
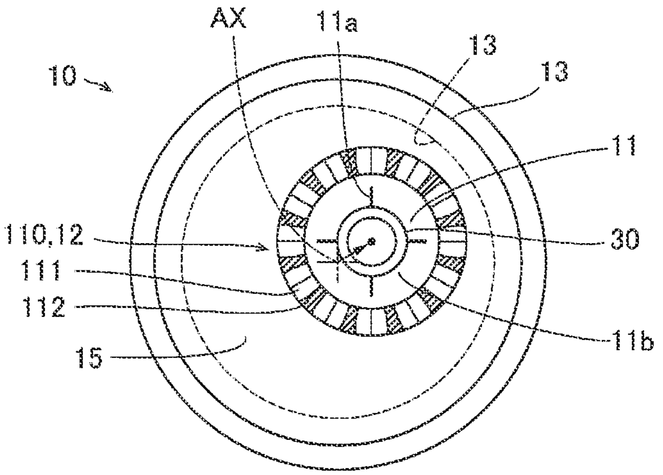
FIG. 12 is a schematic diagram illustrating a bottom view of the cap illustrating a state where an insert position of the aspiration tube is displaced.

With the elastic portion 15, it is possible to obtain an effect of adjusting the positions of the slit 11*a* and the first contact portion 110 in plan view according to the insert position of the aspiration tube 30. Specifically, as illustrated in FIG. 12, it is possible to move the entire slit-formed portion 11 and first contact portion 110 to follow the position of the aspiration tube 30 with the elastic deformation of the elastic portion 15 also when the aspiration tube 30 is inserted while being displaced from the center (that is, center axis AX) of the slit 11*a*. Consequently, it is possible to bring the protrusions 111 into contact with the peripheral surface 31 of the aspiration tube 30 also when the aspiration tube 30 that is inserted while being displaced from the center of the slit 11*a* is withdrawn. In the case of position displacement as illustrated in FIG. 12, when the aspiration tube 30 is completely withdrawn from the slit 11*a*, the slit-formed portion 11 is moved back to the original position with the elastic force of the elastic portion 15.

In the configuration example of FIG. 4, the slit-formed portion 11 is connected to the elastic portion 15 to project to the bottom surface 22 side of the container main body 20. The elastic portion 15 is formed to tilt from a periphery portion of the cap 10 toward the slit-formed portion 11. With this, the slit-formed portion 11 is formed in a projecting form on the bottom surface 22 side in advance while the aspiration tube 30 is not inserted therein. As illustrated in FIG. 7, it is possible to deform the slit-formed portion 11 by a great amount to the opening 21 side from the state of projecting form to the bottom surface 22 side when the aspiration tube 30 inserted in the slit 11*a* is withdrawn. With this, since it is possible to secure a great deformation amount of the surface 11*c* of the slit-formed portion 11 on the bottom surface 22 side, it is possible to increase the movement amount of the protrusions 111 during the deformation of the surface 11*c* of the slit-formed portion 11 on the bottom surface 22 side. Consequently, it is possible to bring the protrusions 111 into contact with the peripheral surface 31 of the aspiration tube 30 more reliably.

Figure 13:
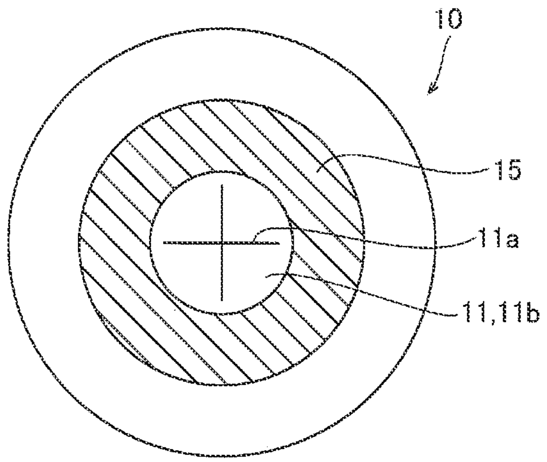
FIG. 13 is a diagram illustrating a first configuration example of an elastic portion.
Figure 14:
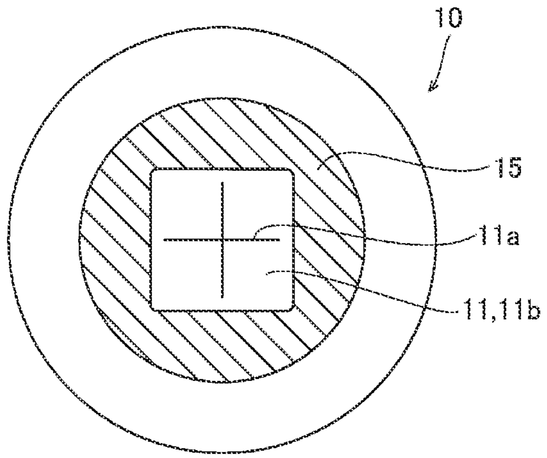
FIG. 14 is a diagram illustrating a second configuration example of the elastic portion.
Figure 15:
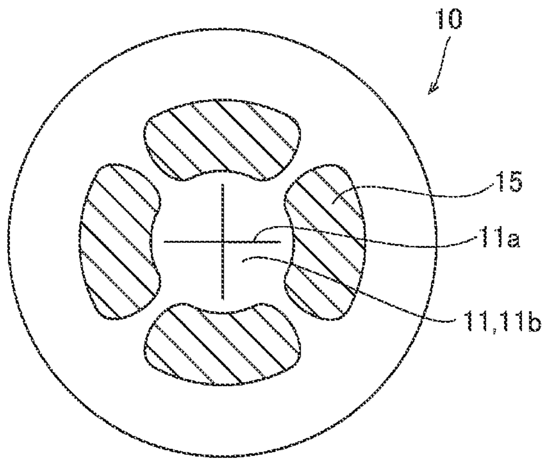
FIG. 15 is a diagram illustrating a third configuration example of the elastic portion.

As illustrated in FIG. 13, the elastic portion 15 is provided around the slit-formed portion 11 circumferentially. With this, since it is possible to support the slit-formed portion 11 by the elastic portion 15 in a balanced way, it is possible to improve the capability of the slit-formed portion 11 to follow the aspiration tube 30. In the example of FIG. 13, the slit-formed portion 11 is formed in a circular shape. The elastic portion 15 is formed in a circular ring shape around the slit-formed portion 11. The slit-formed portion 11 may be formed in a polygonal shape. For example, the slit-formed portion 11 may be formed in a substantially rectangular shape as illustrated in FIG. 14. In this case, the elastic portion 15 includes an inner periphery portion in a rectangular shape corresponding to the slit-formed portion 11. The elastic portion 15 may not be continuous in a ring shape as illustrated in FIG. 15.

Second Contact Portion

Figure 16:
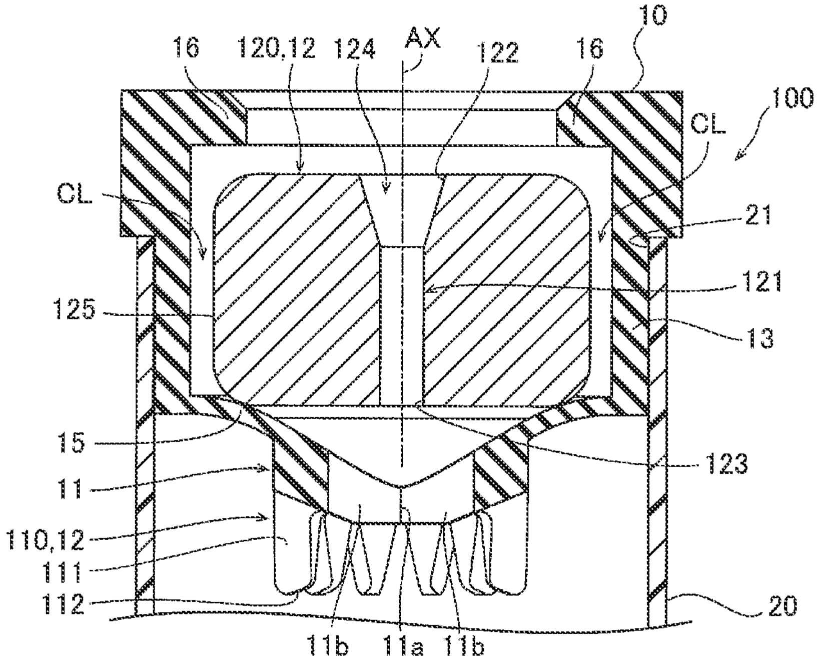
FIG. 16 is a diagram illustrating an enlarged cross-sectional view of a configuration example of the cap including a second contact portion and the specimen container.

As the example illustrated in FIG. 16, the specimen container 100 may be provided with a second contact portion 120 on the opening 21 side closer than the slit-formed portion 11 is.

Specifically, the contact portion 12 includes the second contact portion 120 arranged on the opening 21 side of the slit-formed portion 11 in the passing direction of the aspiration tube 30. With this, it is possible to remove the specimen 90 attached to a portion passing through the slit 11*a* when the aspiration tube 30 is withdrawn from the specimen container 100. With the second contact portion (120), it is possible to inhibit the scattering of the specimen 90 attached to the slit 11*a* to the outside of the opening 21 when the aspiration tube 30 is withdrawn from the slit 11*a*, and the clearance of the slit 11*a* is closed.

The second contact portion 120 is formed of an absorbent material. The absorbent material is a porous material having a continuous pore structure, for example. The continuous pore structure is a structure in which many hollow spaces are formed in the inside of the material, and the many hollow spaces communicate with each other. The second contact portion 120 is formed of a polyurethane sponge of a type that has a fine continuous pore structure, for example. The second contact portion 120 aspirates a liquid that is brought into contact with the surface by capillarity. With this, it is possible to absorb the specimen 90 attached to the aspiration tube 30 and remove the specimen 90 from the peripheral surface 31 of the aspiration tube 30.

The second contact portion 120 includes a channel portion 121 that allows the aspiration tube 30 to pass therethrough in contact therewith. In the example of FIG. 16, the channel portion 121 is a through-hole with a smaller inner diameter than an outer diameter of the aspiration tube 30. Therefore, when the aspiration tube 30 passes through the channel portion 121, the peripheral surface 31 of the aspiration tube 30 slides while being in contact with an inner surface of the channel portion 121. With this, it is possible to wipe off the specimen 90 attached to the peripheral surface 31 of aspiration tube 30 by the inner surface of the channel portion 121 in a process in which the aspiration tube 30 passes through the channel portion 121 of the second contact portion 120. Consequently, it is possible to effectively inhibit the specimen 90 from remaining on the peripheral surface 31 of the aspiration tube 30. The channel portion 121 may be a penetrating slit like the one formed in the slit-formed portion 11, for example.

In the example of FIG. 16, the channel portion 121 is formed such that an inner diameter of an upper surface opening 122 is formed greater than an inner diameter of a lower surface opening 123. The channel portion 121 includes a tapered guiding portion 124 continuous from the upper surface opening 122. With this, it is possible to easily perform the insertion of the aspiration tube 30.

In the example of FIG. 16, the cap 10 includes a locking portion 16 projecting from the cylindrical portion 13 toward the center axis AX of the opening 21. The second contact portion 120 is arranged between the slit-formed portion 11 and the locking portion 16 inside the cylindrical portion 13. The second contact portion 120 is formed with a clearance CL between the cylindrical portion 13 and the second contact portion 120 so as to be movable in the cylindrical portion 13. Specifically, the second contact portion 120 is separately provided from the cap 10 as a separate part and is movably stored inside the cap 10. The second contact portion 120 is arranged on a surface of the slit-formed portion 11 on the opening 21 side.

Figure 17:
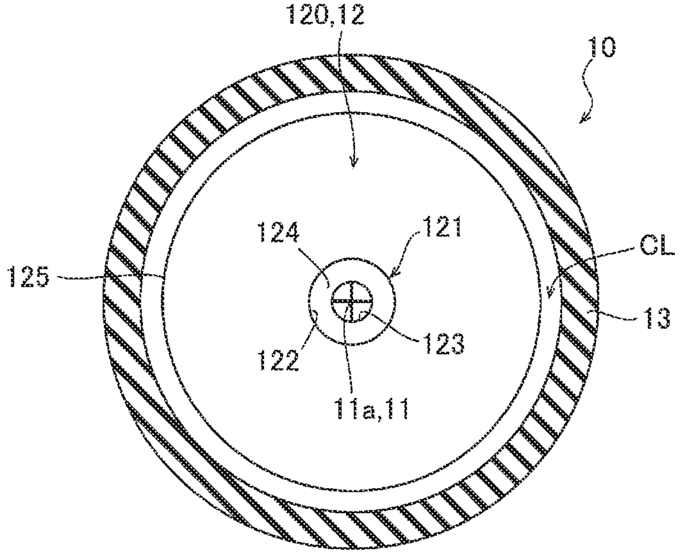
FIG. 17 is a schematic diagram illustrating a transverse cross-sectional view of the cap illustrating the second contact portion and a cylindrical portion.

The movement of the second contact portion 120 to the opening 21 side is restricted by the locking portion 16. The locking portion 16 is a rib that is formed to project from an upper end portion of the cylindrical portion 13 in a direction of the center axis AX of the cylindrical portion 13. The movement of the second contact portion 120 to the bottom surface 22 side is restricted by the slit-formed portion 11. As illustrated in FIG. 17, in plan view, the outline of the second contact portion 120 is a circular shape that is slightly smaller than the inner diameter cylindrical portion 13. Therefore, the clearance CL is formed between a side surface 125 of the second contact portion 120 and an inner peripheral surface of the cylindrical portion 13.

With this, it is possible to store the second contact portion 120 in the inside of the cap 10. Therefore, for example, comparing with the configuration in which the second contact portion 120 is attached to the container main body 20 separately from the cap 10, it is possible to simplify the structure of the specimen container 100. The second contact portion 120 can be moved in the cylindrical portion 13 by the width of the clearance CL between the cylindrical portion 13 and the second contact portion 120. Therefore, it is possible to move the second contact portion 120 to follow the position displacement of the aspiration tube 30 also when the aspiration tube 30 is inserted while being displaced from the center of the slit 11*a*.

Modification of Cap

In the configuration example of FIG. 16, the contact portion 12 includes the first contact portion 110 and the second contact portion 120. With this, it is possible to remove the specimen 90 attached to the aspiration tube 30 for multiple number of times by the first contact portion 110 and the second contact portion 120 during the withdrawal of the aspiration tube 30. With the synergistic effect of the first contact portion 110 and the second contact portion 120, it is possible to more effectively inhibit the specimen 90 from remaining on the surface 11*c* of the aspiration tube 30 after being withdrawn from the specimen container 100.

Figure 18:
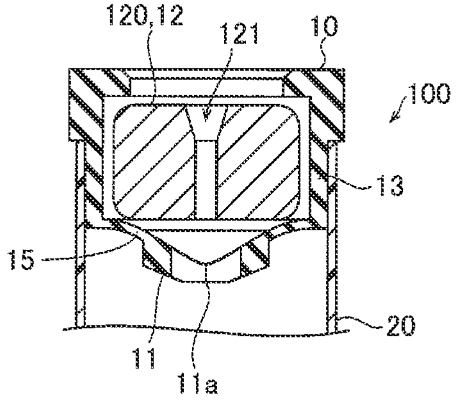
FIG. 18 is a diagram illustrating a second configuration example of the cap including the second contact portion.

In the example of FIG. 18, the first contact portion 110 is not provided in the cap 10, but the second contact portion 120 is provided. Thus, only the second contact portion 120 may be provided in the cap 10. As illustrated in FIG. 4, the second contact portion 120 may not be provided in the cap 10, but the first contact portion 110 may be provided.

Figure 19:
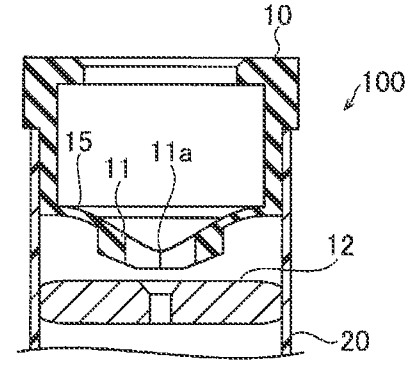
FIG. 19 is a diagram illustrating a modification of the cap including the contact portion.

As illustrated in FIG. 19, the contact portion 12 may be arranged away from the cap 10. In this case, the contact portion 12 can be mounted or fixed on the container main body 20 as a separate part from the cap 10.

The cap 10 and the container main body 20 may be integrally provided. The cap 10 may be integrated with the container main body 20 by adhering, welding, or another method while being fitted to the opening 21 of the container main body 20.

Figure 20:
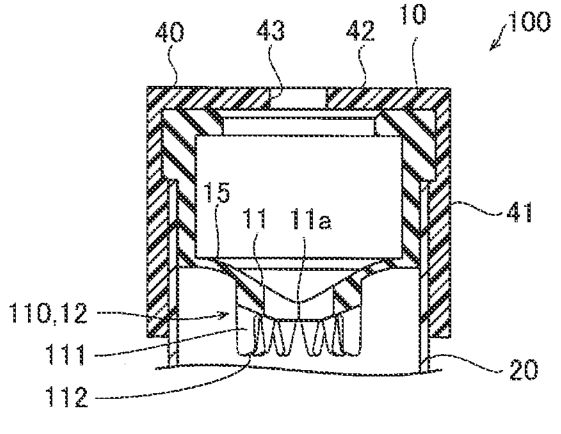
FIG. 20 is a diagram illustrating a side view of an example of a case where a cap cover is attached to the specimen container.

As illustrated in the example of FIG. 20, the specimen container 100 may include a cap cover 40 covering the cap 10.

To be specific, the cap cover 40 is arranged on the container main body 20 to cover the cap 10. The cap cover 40 includes a peripheral wall portion 41 arranged to surround the periphery of the container main body 20. With this, it is possible to easily attach and remove the cap 10 by grasping the peripheral wall portion 41 of the cap cover 40.

The cap cover 40 is formed of a resin material such as polyethylene, for example.

The cap cover 40 includes a top portion 42 connected to the peripheral wall portion 41. The top portion 42 is provided with a smaller opening 43 than the opening 21 of the container main body 20. With this, it is possible to inhibit liquid leaking to the outside of the cap cover 40 even if the liquid leaks out of the slit 11*a*.

Figure 21:
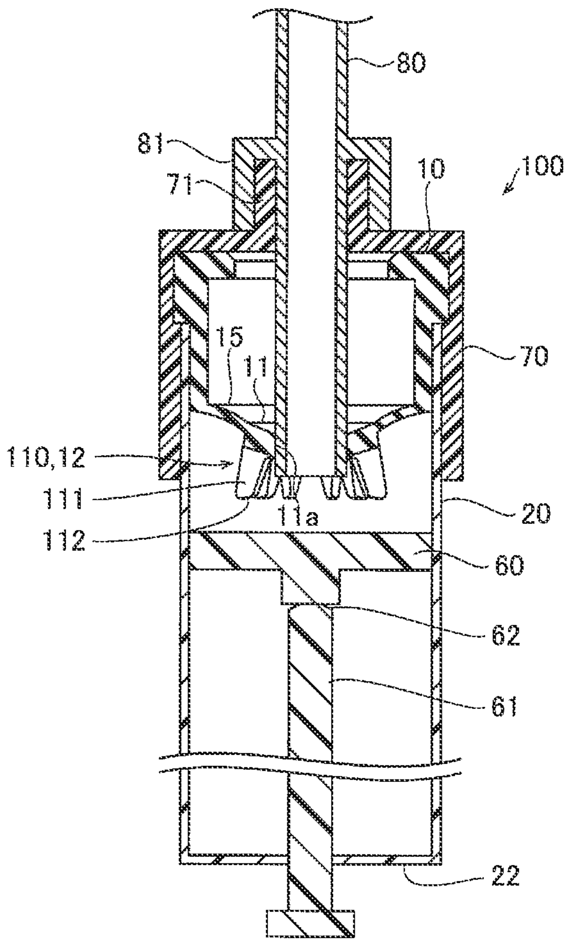
FIG. 21 is a diagram illustrating a side view of an example of a case where a piston is provided to the specimen container.
Figure 22:
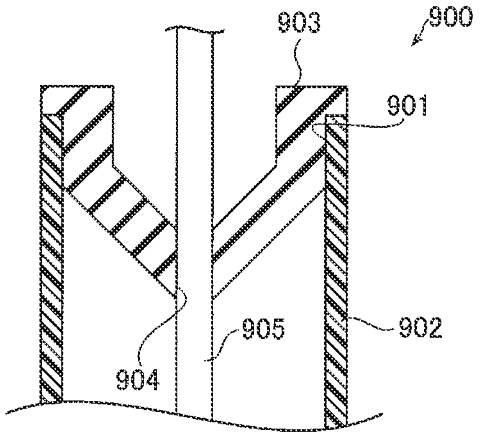
FIG. 22 Related Art
FIG. 22 is a diagram illustrating a side view of a conventional specimen container.

As the example illustrated in FIG. 21, the specimen container 100 may be provided with a piston 60 and a piston rod 61.

To be specific, the specimen container 100 includes the piston 60 provided in the container main body 20 and that slides in the container main body 20 and the piston rod 61 connected to the piston 60 and projecting from the bottom surface 22 of the container main body 20. A cut 62 that allows the piston rod 61 to be broken and removed from the piston 60 is provided in the piston rod 61 in the vicinity of the piston 60. A tube portion 80 that is inserted into the slit 11*a* of the cap 10 is attachable to the cap cover 70. With this, it is possible to easily introduce the specimen 90 into the container main body 20 inside the slit 11*a* through the tube portion 80 by withdrawing the piston rod 61 to move the piston 60 to the bottom surface 22 side of the container. It is possible to inhibit the piston rod 61 from being obstructive by breaking and removing the piston rod 61 in the vicinity of the piston 60 after the piston rod 61 is withdrawn, and the specimen 90 is introduced.

The tube portion 80 is a part for the specimen aspiration that is separately formed as a separate body from the cap cover 70. With an engaging portion 71 of the cap cover 70 and an engaging portion of the tube portion 80 being engaged with each other, it is possible fix the tube portion 80 to the container main body 20. When the tube portion 80 is attached to the cap cover 70, a tip of the tube portion 80 is inserted in the slit 11*a*. The tube portion 80 is attached to the cap cover 70 when the specimen 90 is introduced in the specimen container 100. After the specimen 90 is introduced in the specimen container 100 through the tube portion 80, the tube portion 80 is removed from the cap cover 70. When the tube portion 80 is removed from the cap cover 70, the tube portion 80 is withdrawn from the slit 11*a*, the slit 11*a* is closed, and the container main body 20 is sealed. When the specimen 90 is aspirated by the aspiration tube 30, the tube portion 80 is removed, and the aspiration tube 30 is inserted into the specimen container 100 in which the slit 11*a* is closed.

One or more embodiments disclosed herein should be considered as not restrictive but illustrative in every respect. A scope of the present invention is indicated by not the above-mentioned descriptions of the embodiment but by a scope of claims and further includes meaning equivalent to the scope of claims and all changes (modifications) within the scope.

The invention claimed is:

1. A specimen container, comprising:

a container main body including an opening and a bottom opposite the opening;

a cap arranged to close the opening of the container main body, the cap including a slit-formed portion including an upper surface, a lower surface facing the bottom of the container main body, and a slit that allows an aspiration tube to pass therethrough; and a first contact portion including protrusions projecting from a circular portion of the lower surface of the slit-formed portion, the circular portion being located farther radially outward than the slit and away from an area of the slit in plan view in an original state in which the aspiration tube is not inserted into the cap, wherein the cap is configured such that:

(i) during an insertion movement of the aspiration tube into the slit toward the bottom, the slit-formed portion is in sliding contact with a peripheral surface of the aspiration tube, causing the slit-formed portion to deform toward the bottom due to friction between the peripheral surface of the aspiration tube and the slit-formed portion, such that the deformation due to the friction during the insertion movement moves tip portions of the protrusions away from the aspiration tube such that the tip portions of the protrusions are out of contact with the aspiration tube during the insertion movement; and (ii) at least during a withdrawal movement of the aspiration tube in the slit toward the opening, the slit-formed portion is in sliding contact with the peripheral surface of the aspiration tube, causing the slit-formed portion to deform toward the opening due to friction between the peripheral surface of the aspiration tube and the slit-formed portion, such that the deformation due to the friction during the insertion movement brings the tip portions of the protrusions into contact with a peripheral surface of the aspiration tube.

2. The specimen container according to claim 1, wherein a center of the protrusions is aligned with a center of the slit as viewed in a passing direction of the aspiration tube.

3. The specimen container according to claim 1, wherein the container main body is in a cylindrical shape.

4. The specimen container according to claim 1, wherein the slit-formed portion includes segments divided by the slit, and a number of the protrusions is greater than a number of the segments.

5. The specimen container according to claim 1, wherein the protrusions of the first contact portion are arranged in a circular ring shape with the tip portions of adjacent ones of the protrusions being brought into contact with each other along with the deformation of the slit-formed portion while the aspiration tube is withdrawn from the slit, and an inner diameter of the ring-shaped first contact portion coincides with an outer diameter of the aspiration tube.

6. The specimen container according to claim 1, wherein the cap further includes an elastic portion provided to surround the slit-formed portion and the first contact portion and that is elastically deformed to movably support the slit-formed portion and the first contact portion.

7. The specimen container according to claim 6, wherein the slit-formed portion is connected to the elastic portion and extend further toward the bottom of the container main body than the elastic portion.

8. The specimen container according to claim 1, wherein the cap includes a second contact portion arranged on the opening side of the slit-formed portion in the passing direction of the aspiration tube, the second contact portion includes a penetrating channel portion that penetrates the second contact portion, and the aspiration tube is configured to pass through and be in contact with the penetrating channel portion.

9. The specimen container according to claim 8, wherein the second contact portion is formed of an absorbent material.

10. The specimen container according to claim 8, wherein the container main body is in a cylindrical, the cap includes a cylindrical portion extending from the slit-formed portion toward the opening and a locking portion projecting from the cylindrical portion toward a center axis of the opening, and the second contact portion is arranged between the slit-formed portion and the locking portion inside the cylindrical portion and is formed with a clearance between the cylindrical portion and the second contact portion so as to be movable in the cylindrical portion.

11. The specimen container according to claim 1, further comprising:

a cap cover arranged on the container main body to cover the cap, wherein the cap cover includes a peripheral wall portion arranged to surround a periphery of the container main body.

12. The specimen container according to claim 11, further comprising:

a piston that is provided in the container main body and slides in the container main body; and a piston rod that is connected to the piston and projects from the bottom of the container main body, wherein the piston rod that is positioned in the vicinity of the piston comprises a cut that allows the piston rod to be broken and removed from the piston.

13. The specimen container according to claim 12, wherein the cap cover is provided with an engaging portion having a thorough hole in which a tube member is insertable and which is aligned with a center of the slit such that the tube member that is inserted in the through hole of the engagement portion is engaged with the engaging portion and is inserted in the slit.

14. The specimen container according to claim 1, wherein the protrusions project from the lower surface of the slit-formed portion toward the bottom of the specimen container such that the tip portions of adjacent ones of the protrusions are spaced apart from each other at equiangular intervals therebetween in a circumferential direction around a center of the slit in the original state of the cap.

15. The specimen container according to claim 1, wherein a width of each of the protrusions gradually narrows in the circumferential direction around the center of the slit, as the protrusion extends downward.

16. The specimen container according to claim 1, wherein the cap further comprises an elastic portion that is provided radially outside of the slit-formed portion to surround the slit-formed portion and is elastically deformable to movably support the slit-formed portion, the elastic portion is integrally formed with the slit-formed portion and has a thickness smaller than that of the slit-formed portion, and the slit extends within the slit-formed portion without extending into the elastic potion such that the elastic portion is not divided into plural segments by the slit.

17. The specimen container according to claim 16, wherein (i) during the insertion movement of the aspiration tube in the slit toward the bottom, the slit-formed portion is deformed toward the bottom due to friction between the peripheral surface of the aspiration tube and the slit-formed portion such that the slit-formed portion is located closer to the bottom than in the original state; and (ii) at least during a withdrawal movement of the aspiration tube in the slit toward the opening, the slit-formed portion is deformed toward the opening due to friction between the peripheral surface of the aspiration tube and the slit-formed portion such that the slit-formed portion is located closer to the opening than in the original state.

18. A cap for a specimen container that is arranged to close an opening of a container main body, comprising:

a slit-formed portion including an upper surface, a lower surface facing a bottom of the container main body, and a slit through which an aspiration tube is configured to pass; and a first contact portion including protrusions projecting from a circular portion of the lower surface of the slit-formed portion, which is located farther radially outward than the slit and away from an area of the slit in plan view in an original state in which the aspiration tube is not inserted into the cap, wherein cap is configured such that:

(i) during an insertion movement of the aspiration tube in the slit toward the bottom, the slit-formed portion is in sliding contact with a peripheral surface of the aspiration tube, causing the slit-formed portion to deform toward the bottom due to friction between the peripheral surface of the aspiration tube and the slit-formed portion, such that the deformation due to the friction during the insertion movement moves tip portions of the protrusions away from the aspiration tube such that the tip portions of the protrusions are out of contact with the aspiration tube during the insertion movement; and (ii) at least during a withdrawal movement of the aspiration tube in the slit toward the opening, the slit-formed portion is in sliding contact with the peripheral surface of the aspiration tube, causing the slit-formed portion to deform toward the opening due to friction between the peripheral surface of the aspiration tube and the slit-formed portion, such that the deformation due to the friction during the insertion movement brings the tip portions of the protrusions into contact with the peripheral surface of the aspiration tube.

19. The cap according to claim 18, wherein a center of the protrusions is aligned with a center of the slit as viewed in a passing direction of the aspiration tube.

* * * * *